(12) United States Patent
Park et al.

(10) Patent No.: US 12,356,174 B2
(45) Date of Patent: Jul. 8, 2025

(54) DISPLAY APPARATUS AND OPERATING METHOD THEREOF

(71) Applicant: SAMSUNG ELECTRONICS CO., LTD., Suwon-si (KR)

(72) Inventors: Hyeeun Park, Suwon-si (KR); Sehyun Kim, Suwon-si (KR); Sukun Yoon, Suwon-si (KR); Jongin Lee, Suwon-si (KR); Kilsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 397 days.

(21) Appl. No.: 18/060,758

(22) Filed: Dec. 1, 2022

(65) Prior Publication Data
US 2023/0147334 A1   May 11, 2023

Related U.S. Application Data

(63) Continuation of application No. PCT/KR2022/017477, filed on Nov. 8, 2022.

(30) Foreign Application Priority Data

Nov. 8, 2021 (KR) .......................... 10-2021-0152570

(51) Int. Cl.
*H04S 1/00* (2006.01)
*H04R 3/00* (2006.01)
(Continued)

(52) U.S. Cl.
CPC .............. *H04S 1/005* (2013.01); *H04R 3/00* (2013.01); *H04R 5/04* (2013.01); *H04S 7/30* (2013.01);
(Continued)

(58) Field of Classification Search
CPC .. H04B 1/40; H04M 1/72412; H04M 1/6075; H04M 1/72436; H04M 1/57;
(Continued)

(56) References Cited

U.S. PATENT DOCUMENTS 10,057,680 B2     8/2018  Bonanno
10,918,936 B2 *   2/2021  Nomura .............. G06F 3/04817
(Continued)

FOREIGN PATENT DOCUMENTS

KR   10-2006-0031551    4/2006
KR   10-2006-0110064   10/2006
(Continued)

OTHER PUBLICATIONS

Extended European Search Report dated Sep. 6, 2024 issued in European Patent Application No. 22890493.4.
Search Report and Written Opinion dated Feb. 17, 2023 issued in International Patent Application No. PCT/KR2022/017477.

*Primary Examiner* — Lun-See Lao
(74) *Attorney, Agent, or Firm* — Nixon & Vanderhye, P.C.

(57) ABSTRACT

A method of operating a display apparatus includes: transmitting stereo data corresponding to first audio data included in content being reproduced, to an external audio apparatus using a first audio transmission profile; changing an audio transmission profile from the first audio transmission profile to a second audio transmission profile, based on an audio-related event occurring while the stereo data is transmitted using the first audio transmission profile; and obtaining first mono audio data by selecting any one of a plurality of pieces of sound data included in the stereo data, and transmitting the first mono audio data and second mono audio data generated based on second audio data corresponding to the audio-related event, to the external audio apparatus using the second audio transmission profile.

19 Claims, 19 Drawing Sheets

(51) Int. Cl.
  *H04R 5/04* (2006.01)
  *H04S 7/00* (2006.01)
(52) U.S. Cl.
  CPC ...... *H04R 2420/03* (2013.01); *H04R 2420/07* (2013.01)
(58) Field of Classification Search
  CPC ......... H04M 2250/02; H04M 2250/74; H04M 1/72451; H04M 1/72454; H04M 1/72457; H04M 19/04; H04M 2250/12; H04N 21/4363; H04N 21/439; H04N 21/4788; H04N 21/488; H04N 5/60; H04N 21/43637; H04N 21/4394; H04N 21/4882; H04N 5/607; H04R 2420/07; H04R 2420/03; H04R 3/00; H04R 3/04; H04R 5/04; H04R 1/1041; H04R 2225/61; H04R 25/55; H04R 25/552; H04R 25/554; H04R 25/558; G06F 1/3293; G06F 11/0745; G06F 11/0757; G06F 13/4295; G06F 3/04842; H04L 12/282; H04L 2012/2843; H04L 2012/285; H04L 65/00; H04L 67/306; H04W 4/02; H04W 4/185; H04W 4/21; H04W 88/02
  USPC .................................. 381/1–3, 56–58; 700/94
  See application file for complete search history.

(56) References Cited

U.S. PATENT DOCUMENTS

| | | | | |
|---|---|---|---|---|
| 11,153,678 | B1* | 10/2021 | Jorgovanovic | H04W 76/14 |
| 2006/0079271 | A1 | 4/2006 | Lee | |
| 2006/0251277 | A1* | 11/2006 | Cho | H04M 1/6066 381/311 |
| 2007/0293315 | A1* | 12/2007 | Mizuta | A63F 13/424 463/36 |
| 2008/0119190 | A1* | 5/2008 | Karabinis | H04B 7/026 455/562.1 |
| 2008/0205664 | A1 | 8/2008 | Kim et al. | |
| 2009/0203439 | A1* | 8/2009 | Okada | G07F 17/3211 463/31 |
| 2009/0209326 | A1* | 8/2009 | Okada | G07F 17/3206 463/43 |
| 2021/0235193 | A1 | 7/2021 | Zheng | |

FOREIGN PATENT DOCUMENTS

| | | |
|---|---|---|
| KR | 10-2008-0079417 | 9/2008 |
| KR | 10-2011-0040500 | 4/2011 |
| KR | 10-2011-0113667 | 10/2011 |
| KR | 10-2013-0122349 | 11/2013 |
| KR | 10-1774842 | 9/2017 |

* cited by examiner

DISPLAY APPARATUS AND OPERATING METHOD THEREOF

CROSS-REFERENCE TO RELATED APPLICATIONS

This application is a continuation of International Application No. PCT/KR2022/017477 designating the United States, filed on Nov. 8, 2022, in the Korean Intellectual Property Receiving Office and claiming priority to Korean Patent Application No. 10-2021-0152570, filed on Nov. 8, 2021, in the Korean Intellectual Property Office, the disclosures of which are incorporated by reference herein in their entireties.

BACKGROUND

Field

The disclosure relates to a display apparatus capable of outputting audio data through an external audio apparatus, and an operating method of the display apparatus.

For example, the disclosure relates to a display apparatus capable of outputting audio data corresponding to content being reproduced or audio data corresponding to a voice chat using an external audio apparatus, and an operating method of the display apparatus.

Description of Related Art

With the development of techniques for display apparatuses, display apparatuses capable of realizing various functions have been developed.

A representative example of a display apparatus is a television (TV). TVs in the related art simply perform a function of receiving a broadcast signal and reproducing corresponding broadcast content (e.g., news, a drama, a music show, etc.).

In recent years, with the development of techniques for display apparatuses, various applications or programs may be stored and installed in TVs to perform various functions, and the installed applications may provide various functions and services in addition to the broadcast content reproduction function. For example, a game application may be stored and installed in a TV, and game content may be executed through the game application. As another example, in addition to broadcast content, content including audio data and video data may be reproduced on a TV. As another example, a video call, a voice call, and the like may be performed with a TV. Here, the term 'audio data' refers to data that may be output in a form that is audibly recognizable by a user, and may also be referred to as 'audio signal', 'audio', and the like. In addition, the term 'video data' refers to data that may be output in a form that is visually recognizable by a user, and may also be referred to as 'image data', 'image', 'image signal', and the like.

Furthermore, with the development of communication techniques or communication connection functions of display apparatuses, display apparatuses capable of performing wired/wireless communication with an external apparatus are being developed. For example, the external apparatus may be an external audio apparatus such as a headset. For example, a display apparatus may be connected to a headset through a Bluetooth communication network. A headset capable of transmitting and receiving audio data through Bluetooth communication may be referred to as 'Bluetooth headset', 'Bluetooth earphones', 'Bluetooth speaker', or the like.

In the above-described examples, when the display apparatus and the headset are connected to each other through a wireless communication network, audio data transmitted from the display apparatus may be output through the headset. Here, there are various audio transmission profiles for transmitting and receiving audio data through a Bluetooth communication network. For example, for transmission and reception of audio data through a Bluetooth communication network, there may be provided a profile for transmitting and receiving a mono signal, and a profile for transmitting a stereo signal.

There is a need to provide a display apparatus capable of performing audio transmission optimized according to an operating situation of the display apparatus when performing transmission or reception of audio data, and a method performed by the display apparatus. For example, it is necessary to provide a display apparatus capable of performing optimized audio transmission in consideration of a service or function that is being performed or is to be performed by the display apparatus, so as to improve user satisfaction, and an operating method of the display apparatus.

SUMMARY

Embodiments of the disclosure provide a display apparatus capable of performing optimized audio transmission according to an operating situation of the display apparatus, and an operation method of the display apparatus.

For example, embodiments of the disclosure provide a display apparatus capable of transmitting audio data to an external audio apparatus by performing audio transmission optimized according to an operating situation of the display apparatus so as to minimize and/or reduce user inconvenience and improve user satisfaction, and an operating method of the display apparatus.

For example, embodiments of the disclosure provide a display apparatus capable of, when a voice chat request is received while audio of game content being reproduced is output through an external audio apparatus, processing the received voice chat request to minimize and/or reduce inconvenience of a user using the game content, and an operating method of the display apparatus.

According to an example embodiment of the disclosure, a display apparatus includes: a display; an audio processor configured to process audio data; a Bluetooth module comprising circuitry configured to perform Bluetooth communication with an external audio apparatus; and a processor configured to execute at least one instruction. The processor is configured to execute at least one instruction to: control the Bluetooth module to transmit stereo data corresponding to first audio data included in content being reproduced to the external audio apparatus using a first audio transmission profile, change an audio transmission profile from the first audio transmission profile to a second audio transmission profile based on an audio-related event occurring while the stereo data is transmitted using the first audio transmission profile, obtain first mono audio data by selecting any one of a plurality of pieces of sound data included in the stereo data, and control the Bluetooth module to transmit the first mono audio data and second mono audio data generated based on second audio data corresponding to the audio-related event to the external audio apparatus using the second audio transmission profile.

For example, the plurality of pieces of sound data included in the stereo data may include first sound data and second sound data.

For example, the audio processor may select any one of R (e.g., right) audio data, which is first sound data included in the stereo data, and L (e.g., left) audio data, which is second sound data included in the stereo data, and obtain the selected data as the first mono audio data.

For example, the audio processor may include: a memory for storing R audio data, including first sound data included in the stereo data, and L audio data, including second sound data included in the stereo data, separately from each other. In addition, the processor may be configured to: parse, while audio data transmission is performed using the first audio transmission profile, the R audio data and the L audio data stored in the memory, respectively, control the Bluetooth module to transmit stereo audio data generated based on the parsed R audio data and the parsed L audio data to the external audio apparatus, parse, based on the audio transmission profile being changed to the second audio transmission profile, any one of the R audio data and the L audio data stored in the memory, and control the Bluetooth module to transmit the second mono audio data to the external audio apparatus, wherein the second mono audio data includes: the first mono audio data corresponding to the parsed audio data; and the second audio data.

For example, the Bluetooth module may be configured to: obtain, based on the audio transmission profile being changed to the second audio transmission profile, the second mono audio data by mixing the first mono audio data with the second audio data, and transmit the second mono audio data to the external audio apparatus.

For example, the memory may include a pulse-coded modulation (PCM) buffer that stores the L audio data and the R audio data separately from each other.

For example, the first audio transmission profile may be Advanced Audio Distribution Profile (A2DP), and the second audio transmission profile may be Hands-Free Profile (HFP).

For example, the processor may be configured to: output a notification message corresponding to the audio-related event, and change the audio transmission profile from the first audio transmission profile to the second audio transmission profile based on an input received in response to the output notification message.

For example, the input may include an input for requesting that operations of inputting and outputting audio data corresponding to the audio-related event be performed using the external audio apparatus.

For example, the processor may be configured to: control, based on the audio-related event occurring while game content is reproduced, the notification message including an icon for activating a microphone included in the external audio apparatus, to be displayed on a screen in which the game content is reproduced.

For example, the processor may be configured to change, based on the input selecting the icon, the audio transmission profile to the HFP, which is the second audio transmission profile.

For example, the processor may be configured to control, based on the occurrence of the audio-related event, a notification message for determining whether to perform a voice chat using the external audio apparatus to be output on the display.

For example, the processor may be configured to control, based on the occurrence of the audio-related event, a notification message for determining whether to perform a voice chat using the external audio apparatus to be output as a voice message through the external audio apparatus.

For example, the notification message may include notification information indicating that the quality of audio corresponding to the content being reproduced may deteriorate based on an operation of outputting audio corresponding to the audio-related event being performed using the external audio apparatus.

For example, the processor may be configured to: perform Bluetooth pairing with the external audio apparatus, and obtain, during the Bluetooth pairing, the specification information including the information about whether the external audio apparatus supports multi-channel Bluetooth communication including a first Bluetooth communication channel and a second Bluetooth communication channel. In addition, based on the audio-related event occurring, the processor may be configured to: control the Bluetooth module such that the first Bluetooth communication channel performs communication according to the first audio transmission profile and the second Bluetooth communication channel performs communication according to the second audio transmission profile, based on the specification information.

For example, based on the audio-related event, the processor may be configured to control the display apparatus to: transmit, to the external audio apparatus, a query signal inquiring as to whether the external audio apparatus supports multi-channel Bluetooth communication including a first Bluetooth communication channel and the second Bluetooth communication channel. In addition, based on a response signal received from the external audio apparatus in response to the query signal, the processor may be configured to: control the Bluetooth module such that the first Bluetooth communication channel performs communication according to the first audio transmission profile and the second Bluetooth communication channel performs communication according to the second audio transmission profile.

According to an example embodiment of the disclosure, a method of operating a display apparatus includes: transmitting stereo data corresponding to first audio data included in content being reproduced, to an external audio apparatus using a first audio transmission profile; changing an audio transmission profile from the first audio transmission profile to a second audio transmission profile based on an audio-related event occurring while the stereo data is transmitted using the first audio transmission profile; and obtaining first mono audio data by selecting any one of a plurality of pieces of sound data included in the stereo data, and transmitting the first mono audio data and second mono audio data generated based on second audio data corresponding to the audio-related event, to the external audio apparatus using the second audio transmission profile.

For example, the transmitting of the second mono audio data may include selecting any one of R audio data, which is first sound data included in the stereo data, and L audio data, which is second sound data included in the stereo data, and obtaining the selected data as the first mono audio data.

For example, the method of operating a display apparatus according to an example embodiment of the disclosure may further include: outputting a notification message corresponding to the audio-related event. In addition, the changing of the audio transmission profile to the second audio transmission profile may include: changing the audio transmission profile from the first audio transmission profile to the second audio transmission profile, based on an input received in response to the output notification message.

For example, the input may include an input for requesting that operations of inputting and outputting audio data corresponding to a voice chat be performed using the external audio apparatus.

For example, the outputting of the notification message may include, based on the voice chat event occurring while game content is reproduced, displaying the notification message including an icon for activating a microphone included in the external audio apparatus, on a screen in which the game content is reproduced.

For example, the outputting of the notification message may include outputting the notification message including notification information indicating that the quality of audio corresponding to the content being reproduced may deteriorate based the voice chat being performed using the external audio apparatus.

For example, the method of operating a display apparatus according to an example embodiment of the disclosure may further include: performing Bluetooth pairing between the display apparatus and the external audio apparatus; obtaining, during the Bluetooth pairing, specification information including information about whether the external audio apparatus supports multi-channel Bluetooth communication including a first Bluetooth communication channel and a second Bluetooth communication channel; and, based on the audio-related event occurring, performing control such that the first Bluetooth communication channel performs communication according to an Advanced Audio Distribution Profile (A2DP), and the second Bluetooth communication channel performs communication according to a Hands-Free Profile (HFP), based on the specification information.

A display apparatus and an operating method thereof according to various example embodiments of the disclosure may perform audio transmission optimized according to an operating situation of the display apparatus.

For example, the display apparatus and the operating method thereof according to various example embodiments of the disclosure may minimize and/or reduce user inconvenience and thus increase user satisfaction by performing audio transmission optimized according to an operating situation of the display apparatus.

For example, the display apparatus and the operating method thereof according to various example embodiments of the disclosure may process, when a voice chat request is received while audio of game content being reproduced by the display apparatus plays is output through an external audio apparatus, the received voice chat request to minimize and/or reduce inconvenience of a user using the game content. For example, when a voice chat event occurs while the display apparatus is outputting reproduced sound of content through an external audio apparatus, a notification message is output to notify a user of the occurrence of the voice chat event, and a subsequent operation is performed according to the user's intention based on an input made by the user in response to the notification message. Accordingly, user satisfaction may be improved.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
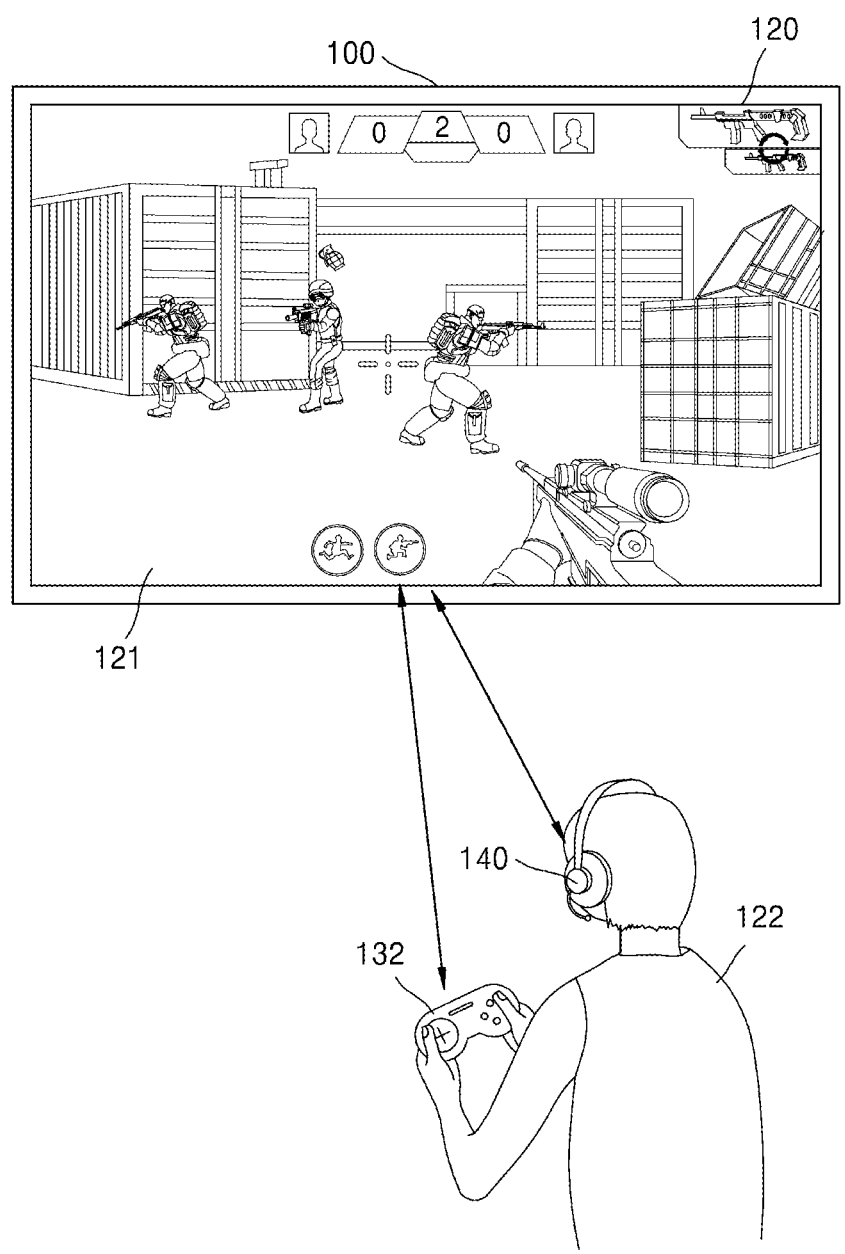
FIG. 1 is a diagram illustrating a display apparatus that is reproducing content according to various embodiments.

Throughout the disclosure, the expression "at least one of a, b or c" indicates only a, only b, only c, both a and b, both a and c, both b and c, all of a, b, and c, or variations thereof.

Hereinafter, various example embodiments of the disclosure will be described in greater detail with reference to the accompanying drawings. The disclosure may, however, be embodied in many different forms and should not be construed as being limited to the various example embodiments of the disclosure set forth herein. In order to clearly describe the disclosure, portions that are not relevant to the description of the disclosure may be omitted, and similar reference numerals are assigned to similar elements throughout the disclosure. In addition, the same reference numerals designate the same components throughout the drawings.

Throughout the present disclosure, when a part is referred to as being "connected to" another part, it may be "directly connected to" the other part or be "electrically connected to" the other part through an intervening element. In addition, when an element is referred to as "including" a component, the element may additionally include other components rather than excluding other components as long as there is no particular opposing recitation.

As used herein, phrases such as "in some embodiments" or "in an embodiment" does not necessarily indicate the same embodiment of the disclosure.

Various embodiments of the disclosure may be represented by block components and various process operations. All or some of such functional blocks may be implemented by various numbers of hardware and/or software components that perform particular functions. For example, functional blocks of the disclosure may be implemented using one or more processors or microprocessors, or circuit elements for intended functions. For example, the functional blocks of the disclosure may be implemented using various programming or scripting languages. The functional blocks may be implemented as an algorithm executed by one or more processors. In addition, the disclosure may employ related art techniques for electronic configuration, signal processing, and/or data processing, etc. Terms such as 'module', 'component', and the like may be used broadly and may not be limited to mechanical and physical elements.

Connection lines or connection members between components illustrated in the drawings are merely illustrative of functional connections and/or physical or circuit connections. In an actual device, connections between components may be represented by various functional connections, physical connections, or circuit connections that are replaceable or added.

In addition, the expression 'at least one of a, b, or c' indicates only a, only b, only c, both a and b, both a and c, both b and c, or all of a, b, and c.

In the various example embodiments of the disclosure, the term 'display apparatus' may refer, for example, to all electronic devices capable of reproducing content and displaying a screen corresponding to the content (e.g., a screen in which the content is reproduced, a menu screen for the content, etc.). For example, the content may be broadcast content (e.g., a real-time broadcast program, etc.), a game, a lecture, a movie, home fitness service content, etc.

For example, the display apparatus according to an embodiment of the disclosure may be any electronic device capable of reproducing or displaying at least one content item, and may have any one of various forms, such as a television (TV), a smart TV, a digital broadcast terminal, a tablet personal computer (PC), a smart phone, a mobile phone, a computer, a laptop computer, etc. Also, the display apparatus may be of a fixed type, a movable type, or a portable type.

FIG. 1 is a diagram illustrating an example display apparatus 100 that is reproducing content according to various embodiments.

With the development of techniques for display apparatuses, display apparatuses capable of realizing various functions have been developed. For example, a display apparatus (e.g., a smart TV) may provide a user with, in addition to a function of providing broadcast content based on broadcast reception, which is a representative function, various additional functions or services. For example, the smart TV may reproduce content of a game, a video call, a home fitness service, or the like. For example, content to be reproduced may include video data and audio data, and in reproduction of such content, a reproduced image of the content may be displayed on a display of a display apparatus, and reproduced audio of the content may be output through an audio output apparatus (e.g., a speaker) included in the display apparatus or an external audio apparatus (e.g., a headset) externally connected to the display apparatus. The external audio apparatus may be an electronic device separate from the display apparatus, and may refer to an audio apparatus capable of outputting and/or receiving audio.

As another example, the display apparatus may perform a video call function, a voice call function, a voice or text chat function, and the like, in addition to a content reproduction function. The terms 'video call', 'voice call', and 'voice chat' may refer, for example, to functions of allowing a plurality of users to have a voice conversation with each other using their electronic devices, and thus are all referred to as 'voice chat' herein.

As described above, the display apparatus may provide a voice chat function or service. The display apparatus may output audio corresponding to a voice chat through an audio output apparatus (e.g., a speaker) included in the display apparatus or an external audio apparatus (e.g., a headset) externally connected to the display apparatus.

The display apparatus may include at least one wireless communication module for performing wireless communication, and may be connected to the external audio apparatus using the wireless communication module. Accordingly, the display apparatus may transmit audio data to the external audio apparatus such that audio is output through the externally connected audio output apparatus.

Referring to FIG. 1, the display apparatus 100 may be connected to an external audio apparatus 140 through a wireless network.

The display apparatus 100 according to an embodiment of the disclosure may provide at least one of a content reproduction function or a voice chat function, and may be connected to the external audio apparatus 140 through a wireless communication network. For example, the display apparatus 100 according to an embodiment of the disclosure may transmit audio data to the external audio apparatus 140 through the wireless communication network, and the external audio apparatus 140 may output audio corresponding to the received audio data.

FIG. 1 illustrates an example in which the display apparatus 100 is reproducing game content. In the example, the display apparatus 100 may display, on a display 120, a game image 121 while the game content is reproduced. In addition, the display apparatus 100 may transmit audio data corresponding to the reproduction of the game content to the external audio apparatus 140 through the wireless communication network. The external audio apparatus 140 may output audio corresponding to the received audio data.

Accordingly, a user 122 may play a game while viewing the game image 121 output from the display 120 and hearing the audio output from the external audio apparatus 140.

In addition, the display apparatus 100 may be connected to a remote control device 132 through a wireless communication network. For example, the display apparatus 100 may receive a control signal from the remote control device 132 through the wireless communication network. The display apparatus 100 may perform a certain operation based on the received control signal. For example, the display apparatus 100 may stop the reproduction of the game content based on a request to stop the reproduction of the game content received from the remote control device 132.

For example, the remote control device 132 may be a control device for controlling the overall operation of the display apparatus 100, which is a target to be controlled. For example, in the case in which the display apparatus 100 is a TV, the remote control device 132 may be a control device manufactured and sold by the manufacturer of the TV for controlling the overall function of the TV. The remote control device 132 may be an integrated control device capable of controlling the overall functions of the TV. In the above-described example, in the case in which the display apparatus 100 is a TV, a control device for controlling the overall functions of the TV may be referred to as 'TV control device' or 'integrated control device'.

As another example, the remote control device 132 may be a dedicated control device for controlling content being reproduced. For example, in the case in which the display apparatus 100 provides an additional function, such as gaming, in order to exclusively control the additional function, a separate control device different from integrated control devices may be used. For example, when the display apparatus 100 provides a gaming function, the display apparatus 100 may be controlled by a game control device for controlling game content or the gaming function. In detail, the remote control device 132 may be a control device that is used for exclusively controlling a gaming function or game content, and may be referred to as 'game control device'.

When the remote control device 132 is a game control device, game content being reproduced on the display apparatus 100 may be controlled based on a control signal received from the remote control device 132. For example, a control operation related to the reproduction of the game content, such as starting reproduction of the game content, pausing reproduction of the game content, adjusting the sound volume, and selecting an item, may be controlled based on a control signal received from the remote control device 132. FIG. 1 illustrates an example in which the remote control device 132 is a game control device, and hereinafter, various example embodiments of the disclosure will be described with reference to the example.

In the above-described examples, the display apparatus 100 may be connected to an external device, for example, the external audio apparatus 140 or the remote control device 132 through a certain communication network conforming to a certain communication standard. For example, a communicator (not shown) included in the display apparatus 100 may include various communication circuitry and perform communication with an external device according to a wireless communication standard such as infrared (IR) communication, Bluetooth, Wi-Fi, Bluetooth Low Energy (BLE), near-field communication (NFC)/radio-frequency identification (RFID), Wi-Fi Direct, ultra wideband (UWB), Zigbee, or the like. For example, the display apparatus 100 may perform communication with the external audio apparatus 140 according to a standard for Bluetooth communication, and may perform communication with the remote control device 132 according to a standard for IR communication.

An example in which the display apparatus 100 is connected to the external audio apparatus 140 through a Bluetooth communication network according to a standard for Bluetooth communication will be described in greater detail below.

Figure 2:
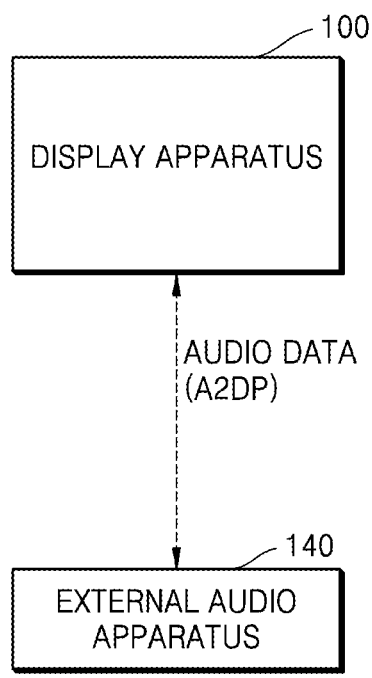
FIG. 2 is a block diagram illustrating an example display apparatus, which is reproducing content, and an example external audio apparatus for outputting audio data corresponding to the content according to various embodiments.
Figure 3:
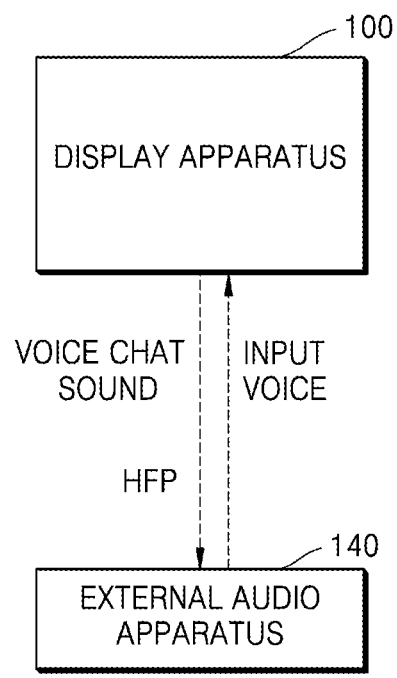
FIG. 3 is a block diagram illustrating an example external audio apparatus, which is transmitting and receiving audio data corresponding to a call function being performed by a display apparatus according to various embodiments.

FIG. 2 is a block diagram illustrating an example display apparatus 100, which is reproducing content, and an example external audio apparatus 140 for outputting audio data corresponding to the content according to various embodiments. In FIG. 2 and FIG. 3 to be described below, the same elements as those of FIG. 1 are illustrated using the same reference numerals. Therefore, the description provided above with reference to FIG. 1 may not be repeated.

There are a plurality of Bluetooth communication profiles, and communication according to any one of the plurality of communication profiles may be performed for transmitting and receiving data. For example, the Bluetooth communication profiles may be classified according to functions to be performed.

For example, examples of Bluetooth communication profiles may include Advanced Audio Distribution Profile (A2DP), Hands-Free Profile (HFP), Audio/Video Remote Control Profile (AVRCP), Headset Profile (HSP), etc. For example, the A2DP may be for transmitting stereo audio data, and the HFP may be for connecting one electronic device to another electronic device to transmit a voice or perform a call. For example, the HFP is for connecting an electronic device (e.g., a smart phone, a display device, etc.) to a headset to transmit a voice or perform a call. In addition, the AVRCP may be used for transmitting and receiving a signal for remote control. For example, the AVRCP may be for manipulation of a remote controller, such as playing, pausing, or fast-forwarding of a sound source. In addition, the HSP may be used with the HFP for performing a call-related manipulation function with a hands-free function.

For example, the Bluetooth communication profiles are generally used for audio transmission, and thus may be referred to as 'audio transmission profiles', 'Bluetooth audio transmission profiles', etc.

The display apparatus 100 according to an embodiment of the disclosure may perform Bluetooth communication with the external audio apparatus 140 based on any one of a plurality of Bluetooth profiles according to an operation or function currently being performed. FIG. 1 illustrates an example in which the external audio apparatus 140 is a headset. In addition, in an embodiment of the disclosure, the external audio apparatus 140 may be wireless earphones, a wireless speaker, or the like, in addition to a headset.

FIG. 2 is a block diagram illustrating example Bluetooth communication performed between the display apparatus 100 and the external audio apparatus 140 when the display apparatus 100 is reproducing content including audio data and video data according to various embodiments.

Referring to FIG. 2, when the display apparatus 100 is reproducing content including audio data and video data, the display apparatus 100 may perform Bluetooth communication with the external audio apparatus 140 based on the A2DP. For example, the display apparatus 100 may transmit audio data corresponding to the content being reproduced, to the external audio apparatus 140 based on the A2DP. For example, the A2DP is for transmitting stereo audio data. The A2DP may be used for providing a user, for example, watching a movie or listening to a music, with high-quality stereo sound.

Accordingly, the display apparatus 140 may perform Bluetooth communication established with the A2DP, to transmit, to the external audio apparatus 140, high-quality stereo audio data of the content being reproduced.

FIG. 3 is a block diagram illustrating an example external audio apparatus 140, which is transmitting and receiving audio data corresponding to a call function being performed by the display apparatus 100 according to various embodiments. For example, FIG. 3 is a diagram illustrating example Bluetooth communication between the display apparatus 100 and the external audio apparatus 140 when the display apparatus 100 performs a function or a service involving an output of audio data, such as a voice call, a video call, or a voice chat, using the external audio apparatus 140. Hereinafter, for convenience of description, various services involving transmission and reception of voices of a user and another user, for example, a video call, a voice call, or a voice chat, may be referred to as 'voice chat'.

The display apparatus 100 may perform a voice chat function.

The voice chat function may be performed between the user 122 of the display apparatus 100 and a counterpart (not shown). For example, the display apparatus 100 of the user 122 may perform communication for a voice chat between a counterpart device (not shown), which is an electronic device of the counterpart (not shown).

For example, when the display apparatus 100 and the counterpart device (not shown) are located far away from each other, the display apparatus 100 may transmit and receive data required for a voice chat to and from the counterpart device (not shown) through a communication network conforming to a communication standard, such as the Internet, 3G, 4G, 5G, and/or 6G. For example, the display apparatus 100 may transmit and receive a stream including at least one of audio data or video data and required for a voice chat to and from the counterpart device (not shown) through a 5G network. In addition, the display apparatus 100 may transmit, to the external audio apparatus 140, audio data received from the counterpart device (not shown), receive, from the external audio apparatus 140, audio data corresponding to a voice of the user 122 input to the external audio apparatus 140, and transmit the received audio data to the counterpart device (not shown).

For example, a voice uttered by the user 122 for the voice chat may be received by an audio input unit (not shown) included in the external audio apparatus 140, and a voice of the counterpart (not shown) to be delivered to the user 122 may be output through an audio output unit (not shown) included in the external audio apparatus 140.

Referring to FIG. 3, when the display apparatus 100 is performing a voice chat function, the display apparatus 100 may perform Bluetooth communication with the external audio apparatus 140 based on the HFP. For example, the display apparatus 100 may transmit audio data corresponding to a voice call, to the external audio apparatus 140 based on the HFP. For example, the HFP is for connecting an electronic device (e.g., a smart phone or a display apparatus) to a headset to perform voice transmission or a call, and may provide low-quality audio data (e.g., a mono signal) and ensure real-time data transmission. For example, in a voice chat, it is important that voices of the user and a counterpart are provided without interruption. Therefore, in a voice chat, it is important to secure real-time data transmission rather than audio quality. Accordingly, the HFP may be used to perform a voice chat function.

Accordingly, while the voice chat function is performed, the display apparatus 140 may perform Bluetooth communication using the HFP. As described above, the HFP enables transmission and reception of a mono signal having a lower quality than that of a stereo signal, but ensures real-time transmission and reception, and thus may be used for performing communication to perform a voice chat with a counterpart without interruption.

While a voice chat is performed, transmission and reception of mono signals are performed according to the HFP, a high-quality stereo signal is not transmittable. In general, in the case described above, the related art display apparatus stops, when a voice chat is requested, outputting audio corresponding to content being reproduced, and initiates outputting of audio corresponding to the voice chat. Accordingly, when the voice chat is initiated, only audio corresponding to the voice chat may be provided even if the user wants to be continuously provided with audio data corresponding to the content currently being output.

For example, there may be a voice chat function provided as an additional service in a game application in order for a plurality of users using game content to have a game-related conversation. In this case, it is required to support a voice chat between a plurality of game users while maintaining reproduction of the game content, in order to allow the game users to use the game content without inconvenience. However, in this case, if outputting of audio corresponding to the game content is interrupted upon initiation of the voice chat, the user still playing the game is unable to hear audio corresponding to the game, and thus may feel inconvenience.

According to an embodiment of the disclosure, in the above-described case, reproduction of content (e.g., game content) may be maintained without interruption while a function or a service (e.g., a voice chat service), which involves outputting of audio different from that of the content being reproduced, is executed, and thus user inconvenience due to interruption of the reproduction of the content may be prevented and/or reduced. Various example embodiments along the lines of that provided above will be described in greater detail below with reference to FIGS. 4 to 17.

Figure 4:
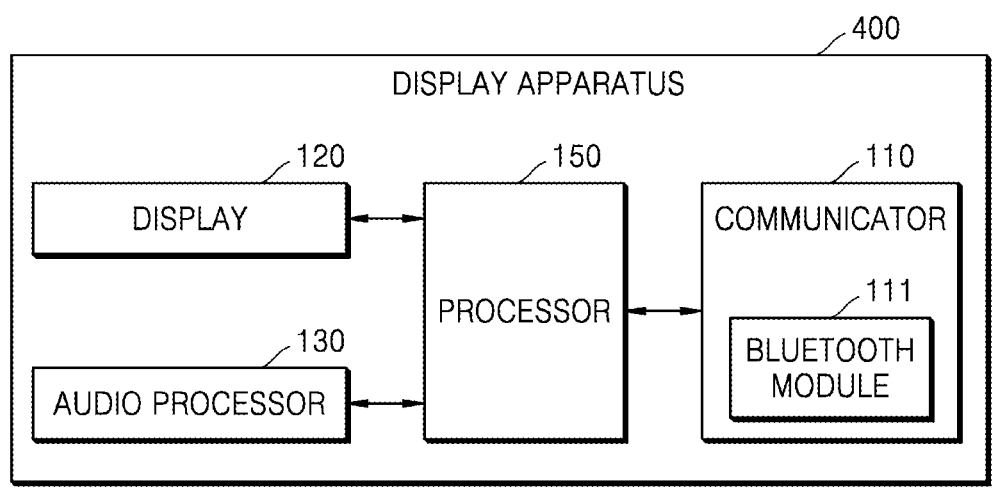
FIG. 4 is a block diagram illustrating an example configuration of a display apparatus according to various embodiments.

FIG. 4 is a block diagram illustrating an example configuration of a display apparatus 400 according to various embodiments. Referring to FIG. 4, the display apparatus 400 according to an embodiment of the disclosure may correspond to the display apparatus 100 illustrated in FIGS. 1 to 3. In addition, in FIG. 4, the same elements as those of FIGS. 1 to 3 are illustrated using the same reference numerals. In describing the display apparatus 400 illustrated in FIG. 4, the descriptions that are provided in connection with FIGS. 1 to 3 may not be repeated.

Referring to FIG. 4, the display apparatus 400 includes a communicator (e.g., including communication circuitry) 110, a Bluetooth module (e.g., including Bluetooth circuitry) 111, the display 120, an audio processor (e.g., including audio processing circuitry) 130, and a processor (e.g., including processing circuitry) 150 configured to execute at least one instruction.

The display 120 displays a screen.

The audio processor 130 may include various audio processing circuitry and is configured to process audio data.

The Bluetooth module 111 may include various Bluetooth circuitry and is configured to perform Bluetooth communication with an external audio apparatus.

The processor 150 may include various processing circuitry and is configured to execute the at least one instruction to perform at least one operation described below. In an embodiment of the disclosure, the processor 150 controls the Bluetooth module 111 to transmit stereo data corresponding to first audio data included in content being reproduced, to the external audio apparatus using a first audio transmission profile, and substitutes the first audio transmission profile with a second audio transmission profile based on an audio-related event occurring while the stereo data is transmitted using the first audio transmission profile. The processor 150 obtains first mono audio data by selecting any one of a plurality of pieces of sound data included in the stereo data, and controls the Bluetooth module 111 to transmit the first mono audio data and second mono audio data, generated based on second audio data corresponding to the audio-related event, to the external audio apparatus using the second audio transmission profile.

In an embodiment of the disclosure, content reproduced by the display apparatus 400 may involve outputting of audio and video. For example, the content may include audio data and video data. For example, audio data included in audio content may have a form of stereo data in order to provide a user with high-quality audio. Alternatively, stereo data may be generated based on the audio data included in the audio content and then used.

For example, the content may be game, movie, broadcast, or lecture content. Hereinafter, for convenience of description, an example will be described in which the content being reproduced by the display apparatus 400 is game content.

The audio-related event may refer, for example, to an event corresponding to an operation involving outputting of audio or an operation for outputting audio. For example, the audio-related event may be an event corresponding to 'voice chat' described above. For example, the audio-related event may be a video call, a voice call, a voice chat, or the like. As another example, the audio-related event may be an event requesting outputting of audio corresponding to other content than the content currently being reproduced.

Hereinafter, for convenience of description, an example will be described in which the audio-related event is an event corresponding to 'voice chat' described with reference to FIG. 1. In addition, an event corresponding to a voice chat may, for example, be referred to as 'voice chat event'.

In an embodiment of the disclosure, the first audio transmission profile may be a Bluetooth communication profile for supporting transmission of stereo data. In addition, the second audio transmission profile may be a Bluetooth communication profile for supporting transmission of mono data. For example, the first audio transmission profile may be the A2DP, and the second audio transmission profile may be the HFP.

For example, based on an audio-related event (e.g., a voice chat event) occurring while the first audio data corresponding to the content being reproduced is transmitted to the external audio apparatus using the first audio transmission profile (e.g., the A2DP), the processor 150 may output a notification message corresponding to the audio-related event. Thereafter, based on an input (e.g., a user input) received in response to the outputting of the notification message, the processor 150 may change a Bluetooth communication profile for audio data transmission, from the first audio transmission profile (e.g., the A2DP) to the second audio transmission profile (e.g., the HFP). Thereafter, the processor 150 may control the Bluetooth module 111 to transmit, to the external audio apparatus, the first mono audio data corresponding to the first audio data and the second mono audio data generated based on the second audio data corresponding to the voice chat event, based on the second audio transmission profile to which the Bluetooth communication profile is changed (e.g., the HFP). Hereinafter, for convenience of description, an example in which the first audio transmission profile is the A2DP, and the second audio transmission profile is the HFP will be described.

In an embodiment of the disclosure, the Bluetooth module 111 may perform Bluetooth communication with at least one external device (e.g., the external audio apparatus 140 illustrated in FIG. 1) according to a Bluetooth communication standard. For example, the Bluetooth module 111 may perform transmission and reception of audio data based on any one of a plurality of profiles defined according to a Bluetooth standard. In addition, in an embodiment of the disclosure, the Bluetooth module 111 may be referred to as a communicator 110 in a broad sense. Here, the term 'profile defined according to a Bluetooth standard' may be referred to as 'Bluetooth communication profile' or 'audio transmission profile'.

In addition, the communicator 110 may include various communication circuitry, including the Bluetooth module 111, and may further include at least one additional communication module including various communication circuitry.

The communicator 110 may include at least one communication module (not shown) including various communication circuitry configured to perform wireless communication with an external electronic device (e.g., a display apparatus (not shown) of the counterpart participating in a voice chat with the user of the display apparatus 100) according to a certain wireless communication standard.

For example, the communicator 110 may further include a communication module (not shown) configured to perform communication with a server (not shown) for supporting long-range communication according to a long-range communication standard. For example, the communicator 110 may include a communication module configured to perform wireless communication according to a communication standard such as a wireless local area network (LAN), wired Ethernet, etc. A wireless LAN communication module (not shown) may include a Wi-Fi communication module (not shown) configured to perform wireless communication according to a Wi-Fi communication standard. As another example, the communicator 110 may include a communication module (not shown) configured to perform communication through a communication network conforming to a mobile communication standard, such as 3G, 4G, 5G, and/or 6G. As another example, the communicator 110 may include a communication module (not shown) configured to perform communication through a network for Internet communication.

The communicator 110 may include at least one communication module (not shown) configured to perform communication according to a wireless communication standard, such as Wi-Fi, BLE, NFC/RFID, Wi-Fi Direct, UWB, Zigbee, etc., in order to support short-range communication with an external device located at a short distance.

For example, the communicator 110 may include a communication module (not shown) configured to perform Internet communication, and the Bluetooth module 111. While a voice chat is performed, the communicator 110 may transmit and receive audio data corresponding to the voice chat to a display apparatus (not shown) of a counterpart participating in the voice chat with the user of the display apparatus 100. In addition, when the display apparatus 100 outputs audio data corresponding to a voice of the counterpart through the external audio apparatus 140 wirelessly connected to the display apparatus 100, the Bluetooth module 111 may transmit the audio data corresponding to the voice of the counterpart to the external audio apparatus 140 and receive audio data corresponding to a voice of the user of the display apparatus 100 input through the external audio apparatus 140.

In an embodiment of the disclosure, the display 120 outputs an image on a screen. In detail, the display 120 may output an image corresponding to video data through a display panel (not shown) included therein so as to allow the user to visually recognize the video data. For example, video data of the content may include a plurality of frame images, and the display 120 may reproduce the video content by consecutively displaying the plurality of frame images under the control by the processor 150.

For example, the display 120 may output a game image corresponding to game content on the screen under the control by the processor 150.

The audio processor 130 may include various audio processing circuitry and perform a process of converting audio data into an analog audio signal and output the converted analog audio signal to an audio output unit (not shown) under the control by the processor 150. For example, the audio processor 130 may decode an audio signal received in the form of a digital signal to convert it into an analog audio signal.

For example, the audio processor 130 may receive audio data input from various sources, perform a process including decoding on the audio data, and provide the processed audio data to the audio output unit (not shown) such that the audio data is output as audio audibly recognizable by the user. As another example, the audio processor 130 may receive audio data input from various sources, perform a process including decoding on the audio data, and provide the processed audio data to the Bluetooth module 111 such that the audio data is transmitted to and then output through the external audio apparatus 140 as audio audibly recognizable by the user. Then, the Bluetooth module 111 may transmit the audio data provided from the audio processor 130 to the external audio apparatus 140. In detail, the Bluetooth module 111 may transmit the audio data processed by the audio processor 130 to the external audio apparatus 140 under the control by the processor 150.

In an embodiment of the disclosure, the processor 150 may include various processing circuitry and performs at least one instruction to perform an intended operation. Here, the at least one instruction may be stored in an internal memory (not shown) included in the processor 150 or a memory (not shown) included in the display apparatus 400 separately from the processor 150.

For example, the processor 150 may execute the at least one instruction to control at least one component included in the display apparatus 400 such that the intended operation is performed. Accordingly, although an example in which the processor 150 performs certain operations is described, it may refer, for example, to the processor 150 controlling at least one component included in the display apparatus 400 to perform the operations. In addition, although an example in which the processor 150 includes one processor is illustrated and described, the processor 150 may include a plurality of processors.

For example, the processor 150 may include random-access memory (RAM) (not shown), which stores signals or data input from the outside of the display apparatus 400 or is used as a storage for various operations performed by the display apparatus 400, read-only memory (ROM) (not shown) storing a control program for controlling the display apparatus 400, an application for providing a certain function or service, and/or a plurality of instructions, and at least one processor (not shown). The at least one processor (not shown) may include a graphics processing unit (GPU) (not shown) for graphics processing on video. The at least one processor (not shown) may be implemented as a system on a chip (SoC) in which a core (not shown) and the GPU (not shown) are integrated. In addition, the processor 150 may include a single processor core (single-core) or a plurality of processor cores (multi-core). For example, the processor 150 may be dual-core, triple-core, quad-core, hexa-core, octa-core, deca-core, dodeca-core, hexadecimal-core, etc.

In an embodiment of the disclosure, the processor 150 may control the overall operation of the display apparatus 400, to process video data and audio data corresponding to game content, output the video data on the display 120, and output the audio data through the audio output unit (not shown). For example, when game content is provided through a game application, the processor 150 may store and execute the game application. As another example, when the game application is stored in a separate storage (not shown), the processor 150 may execute the game application stored in the storage (not shown) and control the game content to be provided to the user.

In various embodiments of the disclosure, the term 'application' may refer, for example, to a program or a processor that performs a service, a function, or a particular operation. In detail, an application may include at least one instruction for performing a service, a function, or a particular operation. In addition, an application may be stored in a processor (not shown) or a memory (not shown) included in the display apparatus 100. For example, an application for providing game content may be referred to as a game application, and an application for providing a voice chat may be referred to as a voice chat application.

In addition, the display apparatus 400 illustrated in FIG. 4 may further include an audio input unit (not shown).

For example, the audio input unit (not shown) may receive audio data from an external source and provide the audio data to the processor 150. The audio input unit (not shown) may include, for example, a microphone. For example, the audio input unit (not shown) may receive a voice of the user. Alternatively, the audio input unit (not shown) may receive a sound around the display apparatus 400.

Figure 5:
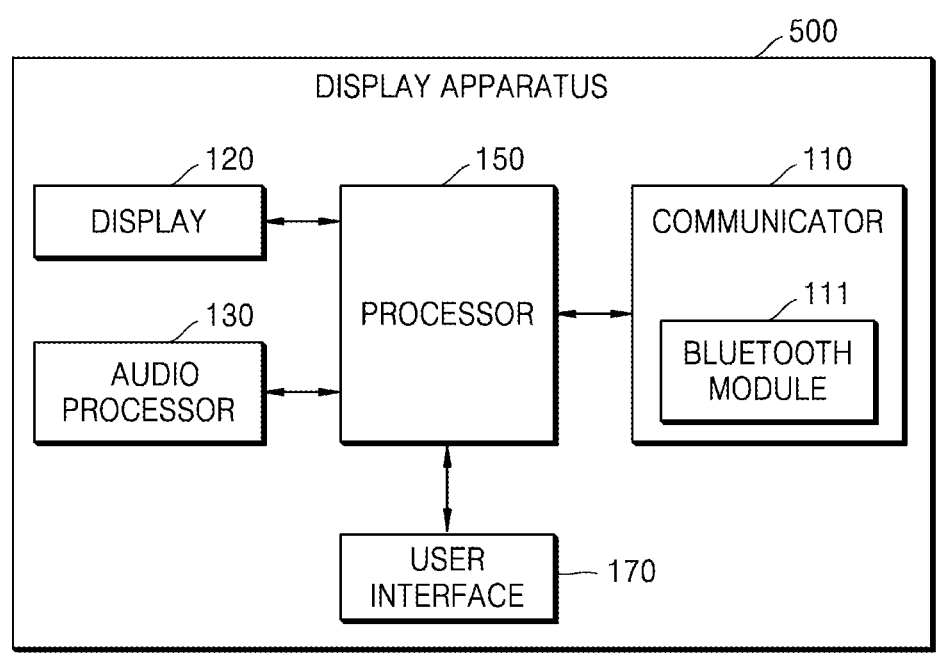
FIG. 5 is a block diagram illustrating an example configuration of a display apparatus according to various embodiments.

FIG. 5 is a block diagram illustrating an example configuration of a display apparatus 500 according to various embodiments. Referring to FIG. 5, the display apparatus 500 according to an embodiment of the disclosure may correspond to the display apparatus 400 illustrated in FIG. 4. In addition, in FIG. 5, the same elements as those of FIG. 4 are illustrated using the same reference numerals. In describing the display apparatus 500 illustrated in FIG. 5, the descriptions that are provided in connection with FIG. 4 may not be repeated.

Referring to FIG. 5, the display apparatus 500 may further include a user interface (e.g., including interface circuitry) 170 in addition to the components of the display apparatus 400.

The user interface 170 may include various interface circuitry and receive a user input. For example, the user interface 170 may receive a user input for controlling the display apparatus 400. The user interface 170 may include a user input device including a touch panel for detecting a touch of the user, a button for receiving a push operation of the user, a wheel for receiving a rotation operations of the user, a keyboard, a dome switch, etc., but is not limited thereto.

In addition, the user interface 170 may include a speech recognition device (not shown) for speech recognition. For example, the speech recognition device (not shown) may be a microphone (not shown) included in the display apparatus 400, and may receive a voice command or a voice request of the user. Accordingly, the processor 150 may control an operation corresponding to the voice command or voice request to be performed. In addition, the speech recognition device (not shown) may be the audio input unit (not shown) described with reference to FIG. 4.

The user interface 170 may include a motion sensor (not shown). For example, the motion sensor (not shown) may detect a motion of the display apparatus 400 and receive the detected motion as a user input. Also, the speech recognition device (not shown) and the motion sensor (not shown) may not be included in the user interface 170, but may be included in the display apparatus 400 as modules independent from the user interface 170.

In addition, a user input may be input through the remote control device 132. In this case, the communicator 110 may receive a control signal corresponding to the user input from the remote control device 132.

Figure 6:
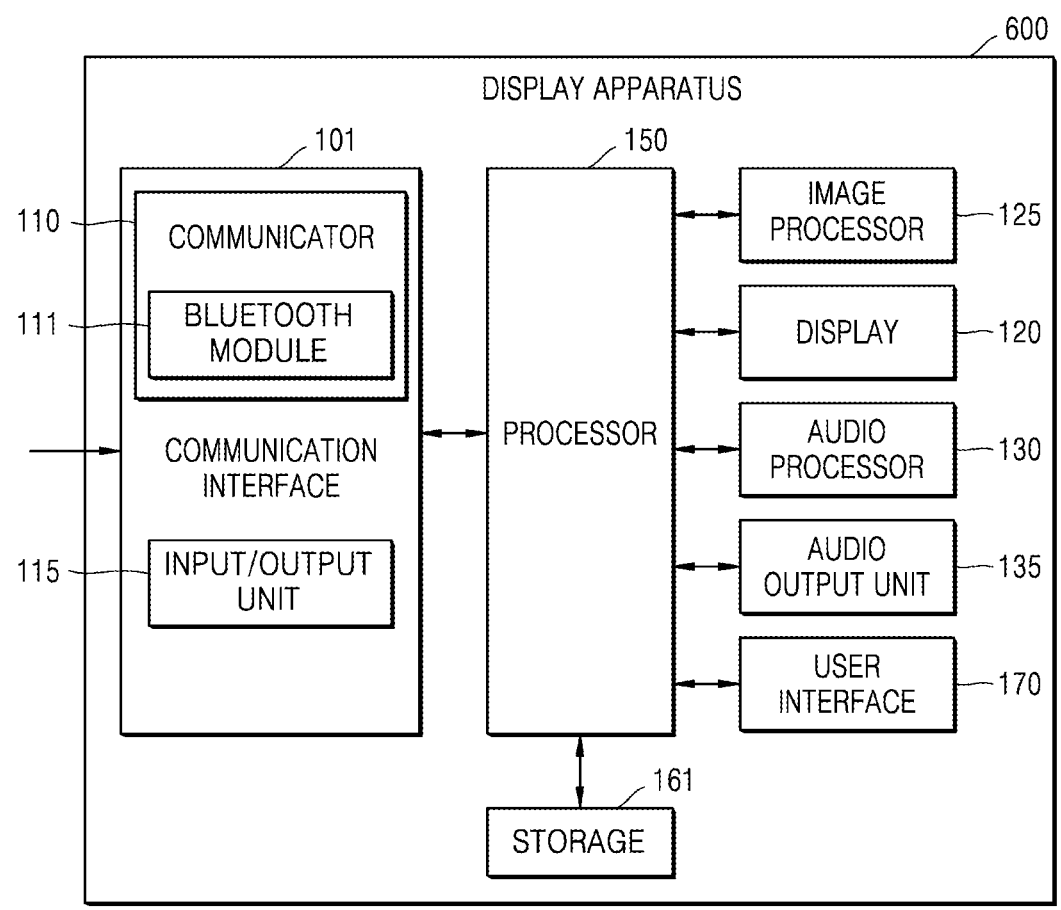
FIG. 6 is a block diagram illustrating an example configuration of a display apparatus according to various embodiments.

FIG. 6 is a block diagram illustrating an example configuration of a display apparatus 600 according to various embodiments. Referring to FIG. 6, the display apparatus 600 according to an embodiment of the disclosure may correspond to the display apparatus 500 illustrated in FIG. 5. In addition, in FIG. 6, the same elements as those of FIG. 5 are illustrated using the same reference numerals. In describing the display apparatus 600 illustrated in FIG. 6, the descriptions that are provided in connection with FIG. 5 may not be repeated.

Referring to FIG. 6, the display apparatus 600 may further include an image processor (e.g., including image processing circuitry) 125 and an audio output unit (e.g., including audio output circuitry) 135, in addition to the components of the display apparatus 500. In addition, the display apparatus 600 may further include at least one of a communication interface (e.g., including communication circuitry) 101 and/or a storage 161, in addition to the components of the display apparatus 500.

The communication interface 101 may include the communicator 110 and an input/output unit (e.g., including input/output circuitry) 115.

The communication interface 101 may include various communication circuitry including at least one of at least one communication module configured to transmit and receive data and/or signals to and from an external device (not shown), or at least one port. For example, the communication interface 101 may include the communicator 110 and the input/output unit 115. The communicator 110 has been described in detail with reference to FIG. 4, and thus a detailed description thereof will not be repeated here.

The input/output unit 115 may include various input/output circuitry including one of a high-definition multimedia interface (HDMI) port (not shown), a component jack (not shown), a PC port (not shown), and a universal serial bus (USB) port (not shown). In addition, the input/output unit 131 may include a combination of a HDMI port, a component jack, a PC port, and a USB port.

For example, under the control by the processor 150, the communication interface 101 may receive video data and audio data included in content received from a source device (not shown) or a server (not shown) according to a communication protocol used for connection therebetween, and output the video data and the audio data to the image processor 125 and the audio processor 130.

For example, the input/output unit 115 may directly receive video data (e.g., game content) to be reproduced by the display apparatus 600, through an HDMI port, a component jack, a PC port, a USB port, or the like.

For example, the image processor 125 may include various image processing circuitry and may process image data under the control by the processor 150. For example, the image processor 125 may process the video data corresponding to the content and output the processed video data to the display 120 under the control by the processor 150. For example, the image processor 125 may process video data corresponding to game content received through the communication interface 101 and output the processed video data to the display 120, under the control by the processor 150. For example, the image processor 125 may generate a user interface screen under the control by the processor 150. For example, under the control by the processor 150, the image processor 125 may generate a game home screen, a home menu screen, a user interface screen for a voice chat, etc., which are described below, and output the generated screen to the display 120.

For example, under the control by the processor 150, the image processor 125 may generate a plurality of images to be displayed on a plurality of partial regions divided from a screen, and output the plurality of images to the display 120.

The display 120 may display image data received from the image processor 125 on the screen. For example, the display 120 may output a screen in which game content is reproduced (e.g., a screen including a game image).

Under the control by the processor 150, the audio processor 130 may convert audio data received from the communication interface 101 into an analog audio signal, and output the analog audio signal to the audio output unit 135.

The audio output unit 135 may include various circuitry and output the received analog audio signal through a speaker.

The storage 161 may store programs related to an operation of the display apparatus 600 and various pieces of data generated during an operation of the display apparatus 600. Alternatively, the storage 161 may store content received from an external device (e.g., a source device or server that provides content). Alternatively, the storage 161 may store data or information necessary for an operation of the display apparatus 600.

For example, the storage 161 may include at least one memory. In this case, the at least one memory may include at least one of a flash memory-type storage medium, a hard disk-type storage medium, a multimedia card micro-type storage medium, a card-type memory (e.g., SD or XD memory), RAM, static RAM (SRAM), ROM, electrically erasable programmable ROM (EEPROM), programmable ROM (PROM), magnetic memory, a magnetic disk, or an optical disc.

Figure 7:
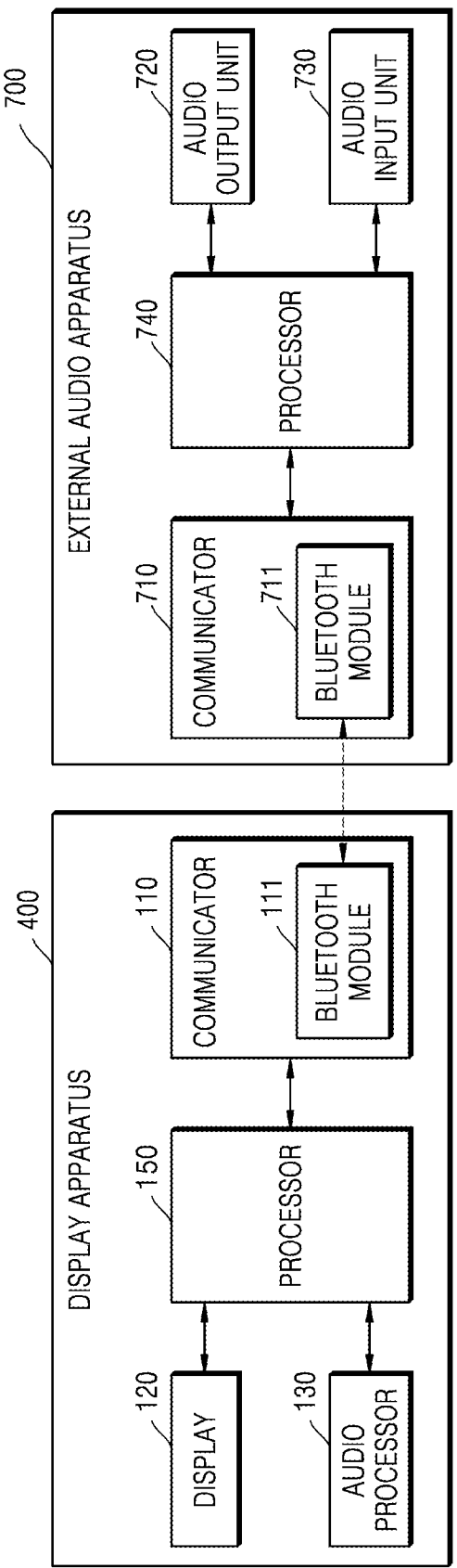
FIG. 7 is a block diagram illustrating an example in which an external audio apparatus performs wireless communication with a display apparatus, according to various embodiments.

FIG. 7 is a block diagram illustrating an example configuration of an external audio apparatus 700 performing wireless communication with the display apparatus 400, according to various embodiments. In FIG. 7, the external audio apparatus 700 may correspond to the external audio apparatus 140 described with reference to FIGS. 1 to 3. Therefore, in describing the external audio apparatus 700 illustrated in FIG. 7, the descriptions that are provided in connection with FIGS. 1 to 3 may not be repeated.

Referring to FIG. 7, the external audio apparatus 700 may include a communicator (e.g., including communication circuitry) 710, an audio output unit (e.g., including audio output circuitry) 720, an audio input unit (e.g., including audio input circuitry) 730, and a processor (e.g., including processing circuitry) 740.

The external audio apparatus 700 may perform communication with an electronic device (not shown) to transmit and receive audio data. FIG. 7 illustrates an example in which the external audio apparatus 700 performs wireless communication with the display apparatus 100, 400, 500, or 600 according to an embodiment of the disclosure. In addition, hereinafter, an example in which the external audio apparatus 700 is connected to the display apparatus 400 illustrated in FIG. 4 through wireless communication will be described with reference to FIG. 7.

For example, the external audio apparatus 700 may be connected to another electronic device through wireless communication. For example, the external audio apparatus 700 may output audio corresponding to audio data transmitted from the display apparatus 400, receive a voice or other sounds, and generate and transmit audio data corresponding thereto. For example, the external audio apparatus 700 may receive a voice uttered by the user, generate audio data corresponding to the received voice, and transmit the audio data to the display apparatus 400.

The communicator 710 may include one or more modules including various communication circuitry that enable wireless communication with the display apparatus 400.

According to an embodiment of the disclosure, the communicator 710 may include a Bluetooth module (e.g., including various Bluetooth circuitry) 711 configured to perform communication according to a Bluetooth communication protocol. The Bluetooth module 711 may transmit and receive data to and from the Bluetooth module 111 of the display apparatus 400 according to a Bluetooth communication protocol.

The audio output unit 720 may include various audio output circuitry and output audio data transmitted from the display apparatus 400. For example, the audio output unit 720 may output audio data received from the display apparatus 400 according to the Bluetooth communication protocol. The audio output unit 720 may include, for example, a speaker.

For example, the audio processor 130 of the display apparatus 400 may generate audio data corresponding to content. For example, the audio data corresponding to the content may be a stereo audio signal for supporting high-quality audio data. The processor 150 may control the audio data generated by the audio processor 130 to be transmitted to the Bluetooth module 711 of the external audio apparatus 700 through the Bluetooth module 111 of the communicator 110 based on an A2DP protocol. Accordingly, the Bluetooth module 711 may receive the audio data corresponding to the content, and the processor 740 may control the received audio data to be output through the audio output unit 720.

The audio input unit 730 may include various audio input circuitry and receive audio data from an external source and provide the audio data to the processor 150. The audio input unit 730 may include, for example, a microphone. For example, the audio input unit 730 may receive a voice of the user. Alternatively, the audio input unit 730 may receive a sound around the external audio apparatus 700.

The processor 740 may include various processing circuitry and control the overall operation of the external audio apparatus 700.

Hereinafter, operations performed by the display apparatus 100, 400, 500, or 600 according to an embodiment of the disclosure will be described in greater detail below with reference to FIGS. 7 and 8A.

Figure 8A:
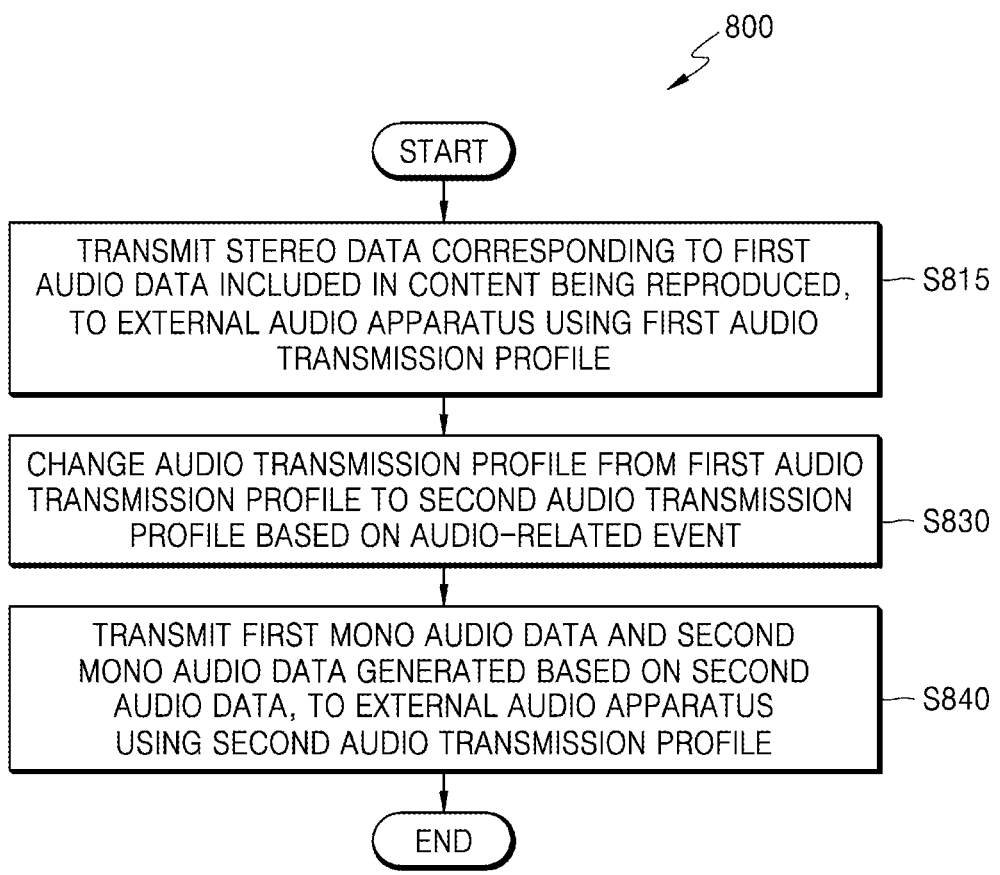
FIG. 8A is a flowchart illustrating an example method of operating a display apparatus according to various embodiments.

FIG. 8A is a flowchart illustrating an example method 800 of operating a display apparatus according to various embodiments. For example, the operating method 800 of a display apparatus is illustrated in FIG. 8A as a flowchart of operations performed by the display apparatus 100, 400, 500, or 600 according to various embodiments described with reference to FIGS. 1 to 6. Therefore, in describing the operations included in the operating method 800 of a display apparatus, the description provided above regarding the operations of the display apparatus 100, 400, 500, or 600 with reference to FIGS. 1 to 6 may not be repeated.

In addition, hereinafter, an example will be described in which the operating method 800 of a display apparatus is performed by the display apparatus 400 illustrated in FIGS. 4 and 7. The operating method 800 of a display apparatus will be described with reference to an example in which an external device, which is connected to a display apparatus (e.g., the display apparatus 400) through wireless communication and is used for audio output, is the external audio apparatus 700. An example will be described in which the display apparatus 400 and the external audio apparatus 700 are connected to each other through a Bluetooth network, and transmit and receive data to and from each other according to any one of a plurality of profiles according to a Bluetooth communication standard. In addition, an example in which the external audio apparatus 700 is a headset as illustrated in FIG. 1 will be described.

Hereinafter, the operating method 800 of a display apparatus will be described with reference to an example in which content being reproduced by the display apparatus 400 is game content.

In an embodiment of the disclosure, while reproducing the content, the display apparatus 400 may output a reproduced sound of the game content through the external audio apparatus 700. For example, the display apparatus 400 may transmit audio data, which is a reproduced sound of the content being reproduced, to the external audio apparatus 700. Then, the external audio apparatus 700 may output the received audio data through the audio output unit 720. Accordingly, the user may view a screen of the content being reproduced through the display 120 of the display apparatus 400, and hear the reproduced sound of the content through the external audio apparatus 700.

As described above, in order for the audio data to be output through the external audio apparatus 700, the display apparatus 400 may have established a communication connection with the external audio apparatus 700. For example, the display apparatus 400 may perform pairing with the external audio apparatus 700. For example, an operation, performed by the display apparatus 400, of searching for, selecting, and/or registering another electronic device to establish a communication connection with through a certain network may be referred to as 'pairing'.

Pairing may be performed using any communication network. For example, pairing may be performed through a Bluetooth communication network, a Wi-Fi communication network, or the like. While pairing is performed, the display apparatus 400 may exchange, with the external audio apparatus 700, network connection information required to establish a communication network therebetween conforming to a certain standard. For example, the display apparatus 400 may exchange, with the external audio apparatus 700, network connection information required to establish a communication network therebetween according to a Bluetooth standard. Also, while pairing is performed, the display apparatus 400 may obtain information about the external audio apparatus 700, for example, information about a product specification of the external audio apparatus 700. For example, the display apparatus 400 may obtain information about whether the external audio apparatus 700 supports multi-channel transmission using a plurality of channels in Bluetooth communication.

According to an embodiment of the disclosure, the display apparatus 400 may complete pairing with the external audio apparatus 700, and accordingly, may be connected to the external audio apparatus 700 through a Bluetooth network.

Referring to FIG. 8A, an example method 800 of operating a display apparatus includes transmitting stereo data corresponding to first audio data included in content being reproduced, to the external audio apparatus using a first audio transmission profile (S815). For example, operation S815 may be performed by the Bluetooth module 111 under the control by the processor 150.

For example, the content reproduced by the display apparatus 400 may involve outputting of audio and video. For example, the content may include audio data and video data. For example, audio data included in audio content may have a form of stereo data in order to provide a user with high-quality audio. Stereo data may be generated based on the audio data included in the audio content and then used.

For example, the first audio data may be audio data corresponding to the content being reproduced. For example, the first audio data included in the content may be decoded by the audio processor 130 of the display apparatus 400. For example, the decoded first audio data may be stereo data.

For example, when game content is being reproduced, the first audio data may be a game sound, which is a reproduced game sound source. As another example, when movie content is being reproduced, the first audio data may be a movie sound, which is a reproduced movie sound source. As another example, when music content is being reproduced, the first audio data may be audio data of the music itself.

In an embodiment of the disclosure, the first audio transmission profile may be a Bluetooth communication profile for supporting transmission of stereo data. In addition, a second audio transmission profile may be a Bluetooth communication profile for supporting transmission of mono data. For example, the first audio transmission profile may be the A2DP, and the second audio transmission profile may be the HFP.

For example, the first audio data may be audio data to be transmitted according to the A2DP, and may be decoded into stereo data. For example, stereo data corresponding to the first audio data may be a stereo signal including right (R) audio data and left (L) audio data. For example, in order to provide a high-quality reproduced content sound, a reproduced sound of the content may be transmitted from the display apparatus 400 to the external audio apparatus 700 in the form of a high-quality stereo signal using the A2DP.

The method 800 of operating a display apparatus further includes changing the audio transmission profile from the first audio transmission profile to the second audio transmission profile, based on an audio-related event occurring while the stereo data is transmitted using the first audio transmission profile (S830). For example, operation S830 may be performed by the processor 150.

For example, a voice chat event may occur while the content is reproduced, e.g., while a reproduced sound source corresponding to the content is transmitted to the external audio apparatus 700.

For example, the audio-related event may refer to an event corresponding to an operation involving outputting of audio or an operation for outputting audio. For example, the audio-related event may be an event corresponding to 'voice chat' described above. For example, the audio-related event may be a video call, a voice call, a voice chat, or the like. As another example, the audio-related event may be an event requesting outputting of audio corresponding to other content than the content currently being reproduced.

Hereinafter, for convenience of description, an example will be described in which the audio-related event is an event corresponding to 'voice chat' described above. In addition, an event corresponding to a voice chat is referred to as 'voice chat event'.

In an embodiment of the disclosure, the processor 150 may perform an operation of changing a Bluetooth communication profile in order to perform an audio output corresponding to a voice chat event that has occurred. For example, the processor 150 may change the Bluetooth communication profile from the first audio transmission profile to the second audio transmission profile in order to perform audio output corresponding to the voice chat event while maintaining the audio output of the content being reproduced. For example, the second audio transmission profile may be a profile for ensuring real-time performance of a voice chat.

The method 800 of operating a display apparatus further includes obtaining first mono audio data by selecting one of a plurality of pieces of sound data included in the stereo data corresponding to the first audio data, and transmitting the first mono audio data and second mono audio data generated based on second audio data corresponding to the audio-related event, to the external audio apparatus using the second audio transmission profile (S840). For example, operation S840 may be performed by the audio processor 130 and the Bluetooth module 111 under the control by the processor 150.

Hereinafter, for convenience of description, the audio data corresponding to the content being reproduced is referred to as 'first audio data', and the audio data corresponding to the voice chat event is referred to as 'second audio data'. For example, the second audio data may be audio data for outputting a voice uttered by a counterpart participating in the voice chat. Alternatively, the second audio data may be audio data for the voice chat transmitted from a device (not shown) of the counterpart participating in the voice chat to the display apparatus 400.

For example, when the voice chat is initiated, transmission and reception of audio data may be performed based on the HFP in order to secure real-time performance of the voice chat. Therefore, in operation S840, audio transmission may be performed such that the audio data for the voice chat and the audio data corresponding to the content currently being reproduced are simultaneously transmitted based on the HFP.

For example, each of the first mono audio data and the second mono audio data may be a mono signal. The first mono audio data may be audio data for outputting a reproduced sound of the content currently being reproduced. For example, the first mono audio data may be a mono signal generated based on any one of first sound data and second sound data included in the stereo data corresponding to the first audio data.

For example, stereo data transmitted using the A2DP may have the form of a stereo signal. In addition, audio data transmitted using the HFP may have the form of a mono signal. Accordingly, in order to transmit, using the HFP, the audio data corresponding to the content being reproduced, it may be necessary to convert stereo audio data into mono audio data. In an embodiment of the disclosure, in order to transmit audio data corresponding to a reproduced sound of the content using the HFP, the first mono audio data may be obtained from the stereo data corresponding to the first audio data.

For example, the stereo data may include a plurality of pieces of sound data. For example, the plurality of pieces of sound data included in the stereo data may include first sound data and second sound data.

For example, the first sound data and the second sound data may be R audio data and L audio data, respectively.

For example, the decoded first audio data may be stereo data including R audio data and L audio data. In this case, the first mono audio data may be any one selected from the L audio data and the R audio data included in the stereo data corresponding to the first audio data. An operation of obtaining the first mono audio data will be described in greater detail below with reference to FIGS. 13 and 14.

As another example, the stereo data may include at least two signals of a plurality of pieces of sound data corresponding to a 5.1 surround audio channel. For example, the 5.1 surround audio channel may include an L surround speaker, an R surround speaker, an R front speaker, an L front speaker, a center channel speaker, and a subwoofer speaker.

In an embodiment of the disclosure, the second mono audio data is data transmitted from the display apparatus 400 to the external audio apparatus 700 using the HFP, and thus may have the form of a mono signal. For example, the second mono audio data may be a mono signal generated based on the first mono audio data and the second audio data corresponding to the voice chat. An operation of obtaining the second mono audio data will be described in greater detail below with reference to FIGS. 13 and 14.

Figure 8B:
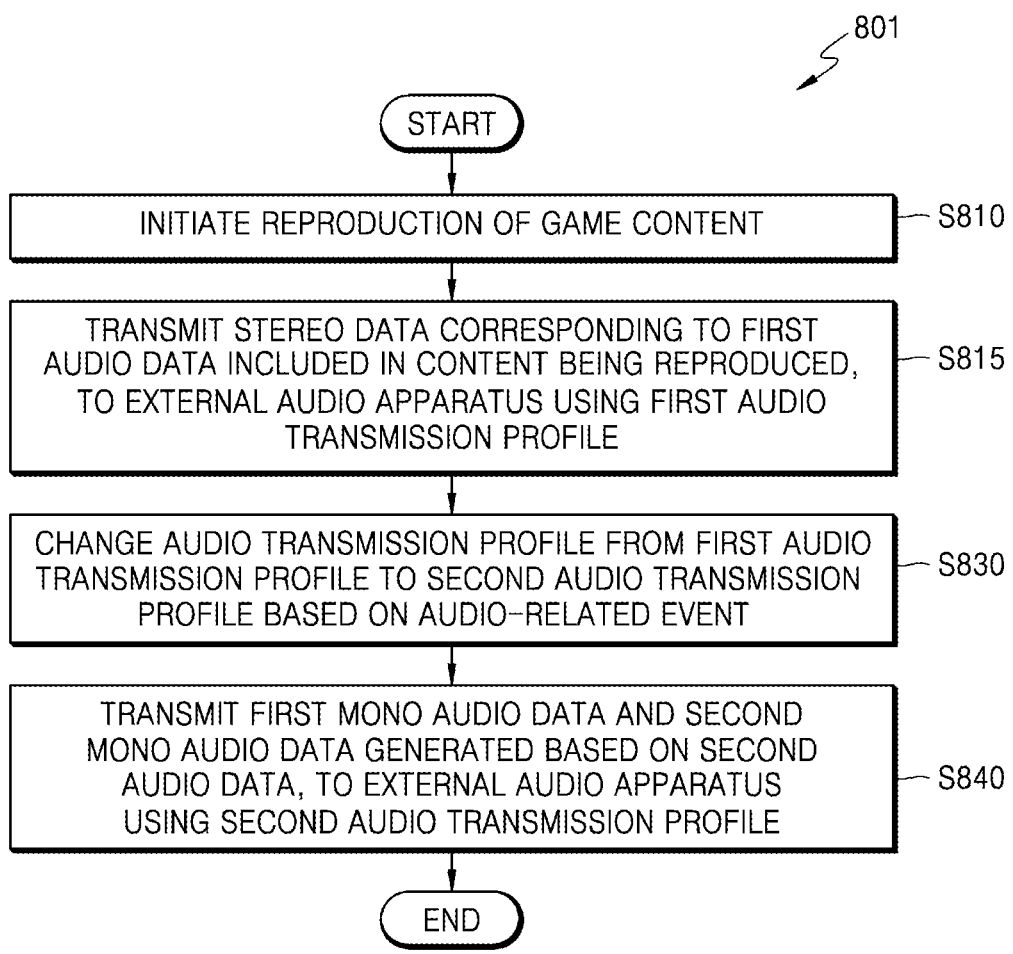
FIG. 8B is a flowchart illustrating an example method of operating a display apparatus according to various embodiments.

FIG. 8B is a flowchart illustrating an example method 801 of operating a display apparatus according to various embodiments. The method 801 of operating a display apparatus is illustrated in FIG. 8B as a flowchart of operations performed by the display apparatus 100, 400, 500, or 600 according to various embodiments described with reference to FIGS. 1 to 7. In addition, among the operations included in the operating method 801 of a display apparatus, the same operations as those illustrated in FIG. 8A are illustrated using the same reference numerals, and thus the description provided above with reference to FIG. 8A may not be repeated.

Referring to FIG. 8B, in the method 801 of operating a display apparatus, operation S810 may be performed prior to operation S815 of FIG. 8A.

For example, the operating method 801 of a display apparatus includes initiating reproduction of content (e.g., game content) (S810). For example, operation S810 may be performed under the control by the processor 150.

When operation S810 is performed, the display apparatus 400 may perform operation S815 in order to provide the user with a reproduced sound corresponding to the content being reproduced.

Figure 8C:
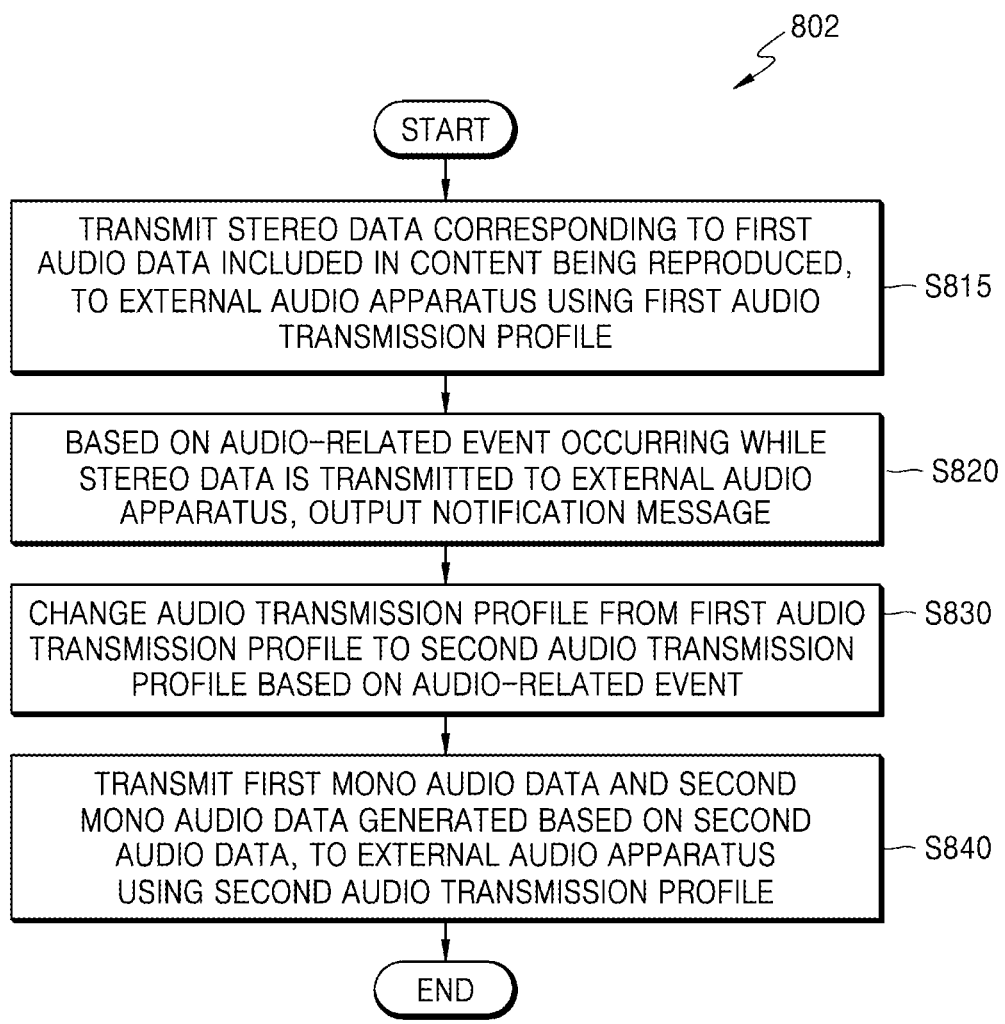
FIG. 8C is a flowchart illustrating an example method of operating a display apparatus according to various embodiments.

FIG. 8C is a flowchart illustrating an example method 802 of operating a display apparatus according to various embodiments. The method 802 of operating a display apparatus is illustrated in FIG. 8C as a flowchart of operations performed by the display apparatus 100, 400, 500, or 600 according to various embodiments described with reference to FIGS. 1 to 7. In addition, among the operations included in the operating method 802 of a display apparatus, the same operations as those illustrated in FIG. 8A are illustrated using the same reference numerals, and thus the description provided above with reference to FIG. 8A may not be repeated.

Referring to FIG. 8C, in the method 802 of operating a display apparatus, operation S820 may be performed subsequent to operation S815. For example, the operating method 802 of a display apparatus may further include operation S820 in addition to the operations of the operating method 800 of a display apparatus.

For example, the method 802 of operating a display apparatus may further include, subsequent to operation S815, outputting, based on an audio-related event (e.g., a voice chat event) occurring while the stereo data corresponding to the first audio data included in the content being reproduced by the display apparatus 400 is transmitted to the external audio apparatus 700 using the first audio transmission profile (e.g., the A2DP), a notification message corresponding to the audio-related event (S820). For example, operation S820 may be performed under the control by the processor 150.

For example, the first audio data may be audio data included in the content being reproduced. For example, the first audio data may be audio data corresponding to a reproduced sound of the content being reproduced. For example, the first audio data may be decoded by the audio processor 130 and transmitted to the external audio apparatus 700 through the Bluetooth module 111. For example, the decoded first audio data may be stereo data, and may be transmitted to the external audio apparatus 700 using the first audio transmission profile (e.g., the A2DP).

For example, when game content is being reproduced, the first audio data may be a game sound, which is a reproduced game sound source. As another example, when movie content is being reproduced, the first audio data may be a movie sound, which is a reproduced movie sound source. As another example, when music content is being reproduced, the first audio data may be audio data of the music itself. For example, a voice chat event may occur while the content is reproduced, e.g., while a reproduced sound source corresponding to the content is transmitted to the external audio apparatus 700.

The first audio data may be audio data transmitted according to the A2DP, and may be a stereo signal. For example, the first audio data may be a stereo signal including R audio data and L audio data. For example, in order to provide a high-quality reproduced content sound, a reproduced sound of the content may be transmitted in the form of a high-quality stereo signal using the A2DP.

For example, prior to operation S820, the display apparatus 400 may be transmitting the first audio data having the form of a stereo signal to the external audio apparatus 700 in real time based on the A2DP. Then, while the first audio data is being transmitted in real time, an audio-related event (e.g., a voice chat event) may occur.

For example, as illustrated in FIG. 1, the display apparatus 400 is reproducing the game content, and displaying the game image 121 on the display 120. While the game content is being reproduced, a reproduced sound of the game content is transmitted to the external audio apparatus 700 and is output by the external audio apparatus 700. For example, audio data corresponding to the reproduced sound of the game content may be transmitted from the Bluetooth module 111 to the Bluetooth module 711 of the external audio apparatus 700 paired with the display apparatus 400 through the Bluetooth network.

In order for the user to view and hear the content being reproduced with more realistic image quality and sound quality, the display apparatus 400 may generate the reproduced sound of the game content as stereo audio data and transmit the stereo audio data to the external audio apparatus 140. In order to transmit the stereo audio data, the processor

150 may perform configuration such that the A2DP is used as the profile of the Bluetooth communication while the content is reproduced.

For example, the voice chat event may be an event indicating that a request corresponding to a function or service for allowing a plurality of users to have a conversation with each other using their voices, for example, a video call, a voice call, a voice chat, or the like, has occurred.

In an embodiment of the disclosure, a voice chat may be requested in various ways.

For example, an application that provides particular functions in the display apparatus 400 may include a voice chat function. For example, a game application may be provided, and the game application may support a voice chat between a plurality of users simultaneously accessing the game application and playing the same game. In the above example, the game application may provide the voice chat function as an additional service. In this case, the game application may receive a request to execute the voice chat function, which an additional service, while the game is played. The request to execute the voice chat function may be a voice chat event.

For example, a voice chat event may occur based on a request by the user using the display apparatus 400. For example, when the user of the display apparatus 400 wants to perform a voice chat with another user (hereinafter, referred to as 'counterpart') who is playing the game together, the user may input, to the display apparatus 400, a user input for requesting execution of a voice chat operation between an electronic device (hereinafter, referred to as "counterpart electronic device") (not shown) of the counterpart and the display apparatus 400. As another example, the counterpart may input, to the counterpart electronic device (not shown), a user input for requesting a voice chat on the counterpart electronic device (not shown) with the user of the display apparatus 400. Then, the display apparatus 400 may receive the user input of the counterpart, and recognize that a voice chat event has occurred based on the user input.

As another example, the display apparatus 400 may store a voice chat application for performing a voice chat. When execution of the voice chat application is requested, the display apparatus 400 may recognize that a voice chat event has occurred. For example, the user of the display apparatus 400 may request to perform a voice chat with the counterpart playing the game together, using the additional function of the game application, while continuously playing the game. Accordingly, the display apparatus 400 may recognize that a voice chat event has occurred. As another example, the counterpart playing the game together with the user of the display apparatus 400 may request to perform a voice chat with the user of the display apparatus 400 through an additional function of the game application executed by the counterpart electronic device (not shown). Accordingly, the display apparatus 400 may receive a control signal corresponding to the request by the counterpart, and recognize that a voice chat event has occurred.

As another example, the display apparatus 100 may simultaneously perform an operation of reproducing one content item and an operation of performing a voice chat, in a multi-task operation environment. For example, the display apparatus 100 may simultaneously perform a plurality of tasks. The term 'task' may refer, for example, to an element of an operation executed or performed by a computing device, and may refer to a piece of work to be performed in a certain operation by the computing device. In addition, a task may be a process for performing a particular operation, a thread for performing a particular operation, a program for performing a particular operation, or the like. Simultaneously performing a plurality of tasks may be referred to as 'multi-tasking'.

In an embodiment of the disclosure, the display apparatus 100 may include a computing device capable of performing multi-tasking, and may simultaneously perform at least two tasks each involving outputting of audio. For example, when a voice chat is requested while game content is being reproduced, the display apparatus 100 may simultaneously perform a task for reproducing the game content and a task for performing a voice chat.

For example, operation S820 may be performed by the display 120 under the control by the processor 150. For example, the notification message may be visually output on the display 120. For example, the processor 150 may control the notification message to be output on at least a partial region of the display 120.

As another example, the notification message may be output as an audible message under the control by the processor 150. For example, the processor 150 may perform control such that audio data corresponding to the notification message is generated and then output through the audio output unit (not shown) of the display apparatus 400, and thus the notification message is delivered to the user as an audible message. The processor 150 may perform control such that audio data corresponding to the notification message is generated and the communicator 110 transmits the generated audio data to the external audio apparatus 700 so as to allow the notification message is delivered, as an audible message, to the user wearing the external audio apparatus 700. Accordingly, the external audio apparatus 700 may provide the user with audio corresponding to the notification message.

The notification message output in operation S820 will be described in greater detail below with reference to examples illustrated in FIGS. 9 to 12. FIGS. 9 to 12 illustrate examples of notification messages output from the display apparatus 100, 400, 500, or 600 according to various embodiments. Examples in which the display apparatus 400 illustrated in FIGS. 4 and 7 outputs a notification message in response to a voice chat event that occurs while content (e.g., game content) is reproduced will be described in greater detail below.

Figure 9:
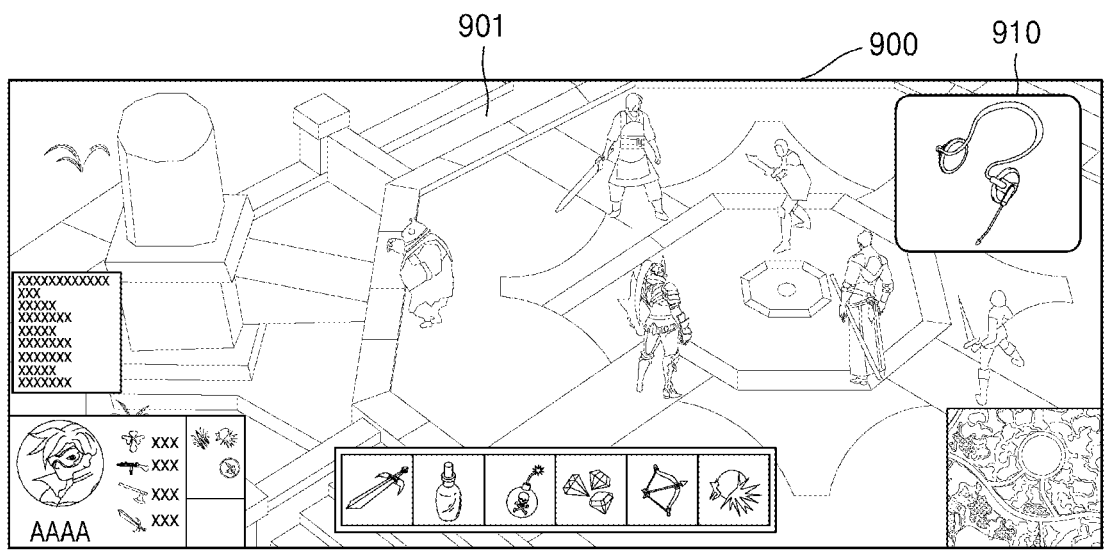
FIG. 9 is a diagram illustrating an example of a notification message output from a display apparatus according to various embodiments.

FIG. 9 is a diagram illustrating an example of a notification message output from a display apparatus according to various embodiments.

Figure 10:
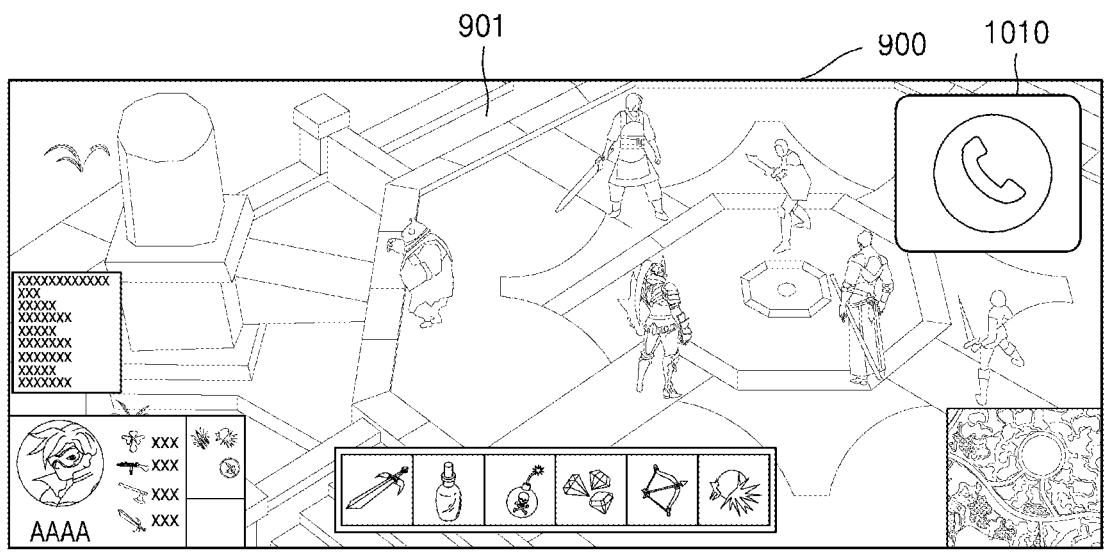
FIG. 10 is a diagram illustrating another example of a notification message output from a display apparatus according to various embodiments.

FIG. 10 is a diagram illustrating another example of a notification message output from a display apparatus according to various embodiments.

Referring to the example illustrated in FIG. 9, the display apparatus 400 is reproducing game content, and thus a game image 901 may be displayed on the display 120.

According to the reproduction of the game content, the display apparatus 400 may transmit a game sound, which is a reproduced game sound source, to the external audio apparatus 700. For example, the Bluetooth module 111 may transmit the game sound to the Bluetooth module 711 of the external audio apparatus 700 while the game image 901 is displayed. Accordingly, the user may play a game while viewing the screen of the display apparatus 400 and hearing the game sound output from the external audio apparatus 700.

When a voice chat event occurs while the game content is reproduced and thus first audio data corresponding to the game sound is transmitted to the external audio apparatus 700, the display apparatus 400 may output a notification message for notifying of the occurrence of the voice chat event.

Referring to the examples illustrated in FIGS. 9 and 10, in an embodiment of the disclosure, the notification message may include an icon indicating that a voice chat event has occurred. In addition, the processor 150 may control the icon to be displayed on at least a partial region of the entire screen of the display 120.

Referring to the example illustrated in FIG. 9, an icon 910 indicating that a voice chat event has occurred may be output on a screen 900 of the display 120. For example, the icon 910 may include a symbol, a character, a figure, or the like corresponding to a voice chat using the external audio apparatus 700. For example, the icon 910 may be an icon indicating a voice chat performed using the currently connected external audio apparatus 700.

For example, the icon 910 may be an icon for activating a microphone included in the external audio apparatus 700. For example, the icon 910 may be an icon indicating activation of the microphone included in the external audio apparatus 700.

Referring to the example illustrated in FIG. 10, an icon 1010 may include a mark indicating that a voice chat is being received, for example, a call reception mark.

In an embodiment of the disclosure, the icon 910 or 1010 may be displayed to overlay a reproduced image (e.g., the game image 901) of the content being reproduced. For example, the icon 910 or 1010 may be displayed to be semi-transparent on the reproduced image, or may be highlighted and displayed.

For example, the display apparatus 400 may simultaneously output audio for notifying of a voice chat and display the icon. For example, the audio output unit 720 of the external audio apparatus 700 may output a notification sound for notifying that a voice chat event has occurred. The audio output unit (not shown) included in the display apparatus 400 may output a notification sound indicating that a voice chat event has occurred.

For example, when the user wants to initiate a voice chat while continuously using the current content, the user may input a user input for selecting the displayed icon 1010 to the display apparatus 400. For example, the user may select the icon 1010 using a remote control device (e.g., the remote control device 132 of FIG. 1), and accordingly, the remote control device may transmit, to the display apparatus 400, a control signal corresponding to the user input. For example, the display apparatus 400 may receive a control signal from the remote control device through the communicator 110, and the processor 150 may perform operation S830 such that a voice chat is initiated while the content is reproduced, based on the received control signal.

For example, the user may input a user input for selecting the icon 910 or 1010 to the display apparatus 400 in various ways. For example, the user may input the user input for selecting the icon 910 or 1010 by pointing, clicking, or double-clicking the icon 910 or 1010 using the remote control device (e.g., the remote control device 132 of FIG. 1). Alternatively, the user may input, to the display apparatus 400, the user input by uttering a user voice, for example, 'Open a voice chat'. Then, the display apparatus 400 may receive the user voice as a user input through the audio input unit 730 included in the external audio apparatus 700 or the audio input unit (not shown) included in the display apparatus 400.

Figure 11:
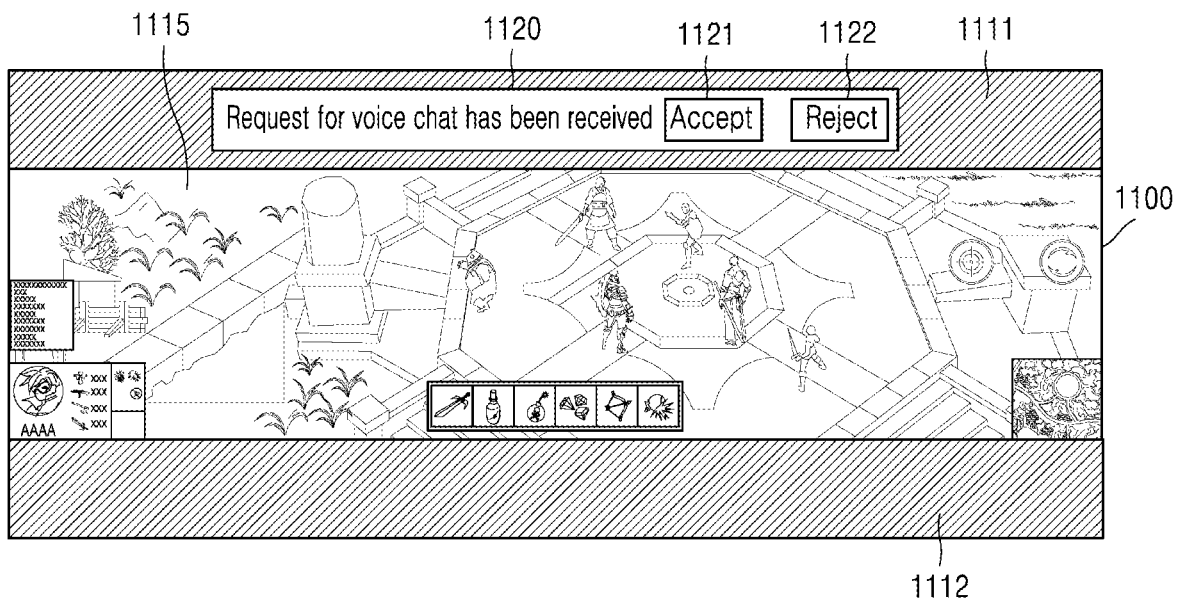
FIG. 11 is a diagram illustrating another example of a notification message output from a display apparatus according to various embodiments.

FIG. 11 is a diagram illustrating another example of a notification message output from a display apparatus according to various embodiments.

Referring to FIG. 11, the notification message output in operation S820 may be output in the form of a text message 1120.

For example, the processor 150 may control a notification message, e.g., the text message 1120, for inquiring as to whether to perform a voice chat using the external audio apparatus 700 to be output on the display 120 based on the occurrence of the voice chat event.

For example, the text message 1120 may include any other message than that illustrated in FIG. 11, for example, 'Would you like to activate the microphone of the headset?Accept/Reject', 'Would you like to connect the microphone to the headset?Accept/Reject', 'Would you like to participate in the voice chat with the headset?Accept/Reject'.

For example, the text message 1120 may include a message indicating the occurrence of the voice chat event. For example, the text message 1120 may include a message for notifying that the voice chat event has occurred and inquiring as to whether to accept the voice chat.

The user may input a user input corresponding to the text message 1120 to the display apparatus 400.

For example, when the user wants to initiate the voice chat while maintaining the reproduction of the current content, the user may select an 'Accept' key 1121. When a user input for selecting the 'Accept' key 1121 is received, the display apparatus 400 may perform operation S830.

When the user does not want to initiate the voice chat while maintaining the reproduction of the current content, the user may select a 'Reject' key 1122. When a user input for selecting the 'Reject' key 1122 is received, the display apparatus 400 may ignore the voice chat event and skip operation S830. Accordingly, the voice chat may be not initiated, and the reproduction of the current content may be maintained.

In addition, the text message 1120 may be displayed on at least a partial region of an entire screen 1100 so as to prevent/reduce the user watching the content current being reproduced from being disturbed. For example, the notification message output in operation S820 may be displayed to be semi-transparent, or may be displayed in a region that minimally covers the reproduced image, such that viewing of the reproduced image of the current content is not disturbed.

For example, when the aspect ratio of the display of the display apparatus 400 is different from the aspect ratio of a reproduced image 1115 (hereinafter, also referred to as the game image 1115) of the content, black regions 1111 and 1112 may exist as illustrated in FIG. 11. Here, the black region may refer to a region in which a meaningful image such as content is not displayed on the entire screen. When the black regions 1111 and 1112 exist, the processor 150 may display the text message 1120 on at least a partial region of the black regions 1111 and 1112.

For example, when the aspect ratio of the display of the display apparatus 400 is 16:9, the aspect ratio of the entire screen 1100 is 16:9. When the game image 1115 having an aspect ratio of 21:9 is displayed on the entire screen 1100, as illustrated in FIG. 11, the black regions 1111 and 1112 may exist. When a black region exists, the processor 150 may display a text message on at least a partial region of the black region (e.g., the black regions 1111 and 1112).

In an embodiment of the disclosure, a voice message may be output instead of the text message 1120 described in the example illustrated in FIG. 11.

For example, based on the occurrence of the voice chat event, the processor 150 may control a notification message for inquiring as to whether to perform a voice chat using the external audio apparatus 700 to be output as a voice message through the external audio apparatus 700. For example, in response to the occurrence of the voice chat event, the processor 150 may control the audio output unit (not shown) included in the display apparatus 400 to output audio 'A voice chat request has been received. Would you like to accept it?'. Alternatively, in response to the occurrence of the voice chat event, the processor 150 may control the audio output unit 720 of the external audio apparatus 700 to output audio 'A voice chat request has been received. Would you like to accept it?'.

Figure 12:
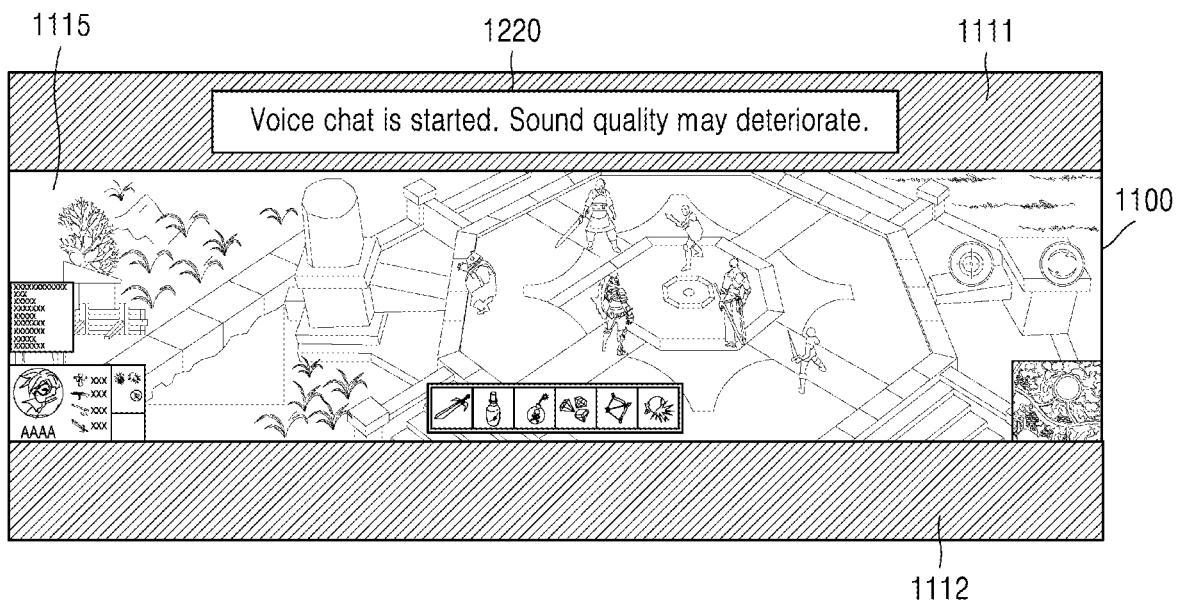
FIG. 12 is a diagram illustrating another example of a notification message output from a display apparatus according to various embodiments.

FIG. 12 is a diagram illustrating another example of a notification message output from a display apparatus according to various embodiments. In FIG. 12, the same elements as those of FIG. 11 are illustrated using the same reference numerals.

Referring to the example illustrated in FIG. 12, a notification message 1220 output in operation S820 is a message corresponding to a voice chat event, and may include a text message indicating that a voice chat is initiated and sound quality may deteriorate.

For example, the notification message 1220 may be a message for notifying the user that the sound quality of audio output from the external audio apparatus 700 may deteriorate due to maintaining of the reproduction of the game content and execution of the voice chat.

For example, the notification message 1220 may include a text message 'Voice chat is started. Sound quality may deteriorate'.

The A2DP may be used as a Bluetooth communication profile that enables high-quality stereo audio data to be transmitted to the external audio apparatus 140. In addition, the HFP may be used as a Bluetooth communication profile to transmit audio in the form of a mono signal having audio quality lower than that of a stereo signal, for ensuring real-time data transmission and communication. Accordingly, the quality of audio data transmitted based on the HFP may deteriorate compared to the quality of audio data transmitted based on the A2DP. For example, when the Bluetooth profile is changed from the A2DP to the HFP and then a voice chat is initiated, the sound quality of a reproduced sound (e.g., a game sound) of content provided together with a voice chat sound may deteriorate.

The user may not want to be provided with a low-quality reproduced sound of the content. Therefore, in an embodiment of the disclosure, when the user is provided with a reproduced sound source of content while initiating a voice chat in advance, a message indicating that sound quality may deteriorate (as the Bluetooth profile is changed to the HFP) may be included in the notification message 1220 to be output. For example, when the voice chat is performed using the external audio apparatus 700, the notification message 1220 may include notification information indicating that the quality of the audio corresponding to the content being reproduced may deteriorate. For example, the quality of the audio provided in the form of a mono signal is lower than the quality of the reproduced sound of the content provided in the form of a stereo signal. Accordingly, the notification message 1220 including notification information indicating this issue may be output to inform the user of such deterioration in the audio quality.

The notification message 1220 may be output in the form of a voice message instead of a text message. Alternatively, the notification message 1220 may be output together with the voice message.

As described above with reference to FIGS. 9 to 12, when a voice chat event occurs while a reproduced sound of content is output through the external audio apparatus 700, a notification message is output to notify the user of the occurrence of the voice chat event, and a subsequent operation corresponding to the user's intention is performed based on a user input made in response to the notification message. Accordingly, user satisfaction may be improved.

Referring back to FIG. 8C, based on a user input received in response to the notification message output in operation S820, the Bluetooth communication profile for audio data transmission may be changed from the first audio transmission profile (e.g., the A2DP) to the second audio transmission profile (e.g., the HFP) (S830). For example, operation S830 may be performed by the display 120 under the control by the processor 150.

For example, the user may view or hear the notification message in operation S820, and then input, to the display apparatus 400, a user input for requesting to initiate a voice chat.

For example, the user input in operation S830 may be made by the user, who is receiving a reproduced sound of the content currently being reproduced using the external audio apparatus 700, for requesting to perform a voice chat while maintaining the reproduction of the content. For example, the user input in operation S830 may be for requesting to perform operations of inputting and outputting audio data according to the voice chat through the external audio apparatus 700.

For example, the user input in operation S830 may be received from the user who is currently using the display apparatus 400, and may be for requesting to initiate the voice chat. For example, the user input may be for requesting to perform the voice chat while maintaining the outputting of the audio corresponding to the content currently being reproduced through the external audio apparatus 700.

In operation S830, the Bluetooth communication profile may be changed from the A2DP to the HFP, based on the reception of the user input for requesting to initiate the voice chat. In detail, in operation S830, when a user input indicating acceptance of the voice chat is received, the A2DP may be substituted with the HFP, and then both of a reproduced sound (e.g., a game sound) of the content being reproduced and a sound corresponding to the voice chat event may be provided to the user.

Hereinafter, for convenience of description, the audio data corresponding to the content being reproduced is referred to as 'first audio data', and the audio data corresponding to the voice chat event is referred to as 'second audio data'. For example, the second audio data may be audio data for outputting a voice uttered by a counterpart participating in the voice chat. Alternatively, the second audio data may be audio data for the voice chat transmitted from a device (not shown) of the counterpart participating in the voice chat to the display apparatus 400.

In the operating method 800, 801, or 802 of a display apparatus according to various embodiments of the disclosure, the first mono audio data corresponding to the first audio data and the second mono audio data generated based on the second audio data corresponding to the voice chat event may be transmitted to the external audio apparatus based on the HFP substituted for the A2DP in operation S830 (S840). For example, operation S840 may be performed under the control by the processor 150.

For example, when the voice chat is initiated in response to the user input of operation S830, audio data transmission and reception based on the HFP may be performed in order to secure real-time performance of the voice chat. Therefore, in operation S840, audio transmission may be performed such that the audio data for the voice chat and the audio data corresponding to the content currently being reproduced are simultaneously transmitted based on the HFP.

For example, each of the first mono audio data and the second mono audio data may be a mono signal. The first mono audio data may be audio data for generating a reproduced sound of the content currently being reproduced. For example, the first mono audio data may be a mono signal generated based on the first audio data.

For example, the first audio data transmitted using the A2DP may have the form of a stereo signal. In addition, audio data transmitted using the HFP may have the form of a mono signal. Accordingly, in order to transmit, using the HFP, the audio data corresponding to the content being reproduced, it is necessary to convert stereo audio data into mono audio data. In an embodiment of the disclosure, in order to transmit audio data corresponding to a reproduced sound of the content using the HFP, the first mono audio data may be obtained from the stereo data.

For example, the first audio data may be a stereo signal including R audio data and L audio data. In this case, the first mono audio data may be any one selected from the L audio data and the R audio data included in the first audio data. An operation of obtaining the first mono audio data will be described in greater detail below with reference to FIGS. 13 and 14.

In an embodiment of the disclosure, the second mono audio data is data transmitted from the display apparatus 400 to the external audio apparatus 700 using the HFP, and thus may have the form of a mono signal. For example, the second mono audio data may be a mono signal generated based on the first mono audio data and the second audio data corresponding to the voice chat. An operation of obtaining the second mono audio data will be described in greater detail below with reference to FIGS. 13 and 14.

Figure 13:
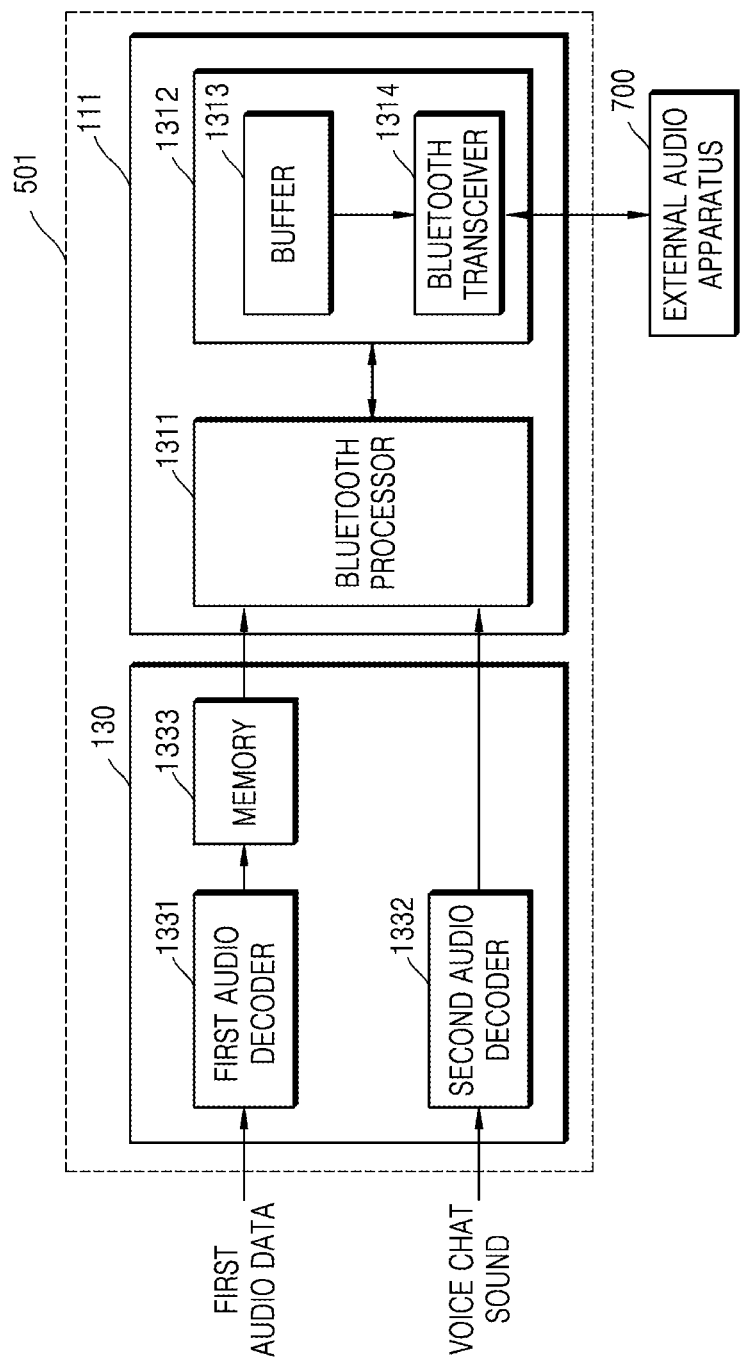
FIG. 13 is a block diagram illustrating an example configuration of an audio processor and a Bluetooth module included in a display apparatus according to various embodiments.

FIG. 13 is a block diagram illustrating an example configuration of the audio processor 130 and the Bluetooth module 111 included in a display apparatus according to various embodiments. In FIG. 13, the same elements as those of FIGS. 4 and 7 are illustrated using the same reference numerals.

Referring to FIG. 13, a block 501 may represent the audio processor 130 and the Bluetooth module 111 included in the display apparatus 100, 400, 500, or 600 according to an embodiment of the disclosure. Hereinafter, an example in which the block 501 is a component included in the display apparatus 400 will be described.

Referring to FIG. 13, the audio processor 130 may include at least one audio decoder configured to process audio data. For example, the audio processor 130 may include a plurality of audio decoders configured to receive and process a plurality of pieces of audio data. Although FIG. 13 illustrates that the audio processor 130 includes two audio decoders, the number of audio decoders included in the display apparatus 400 may vary. In the case where the audio processor 130 includes three or more audio decoders, the audio decoders may be arranged in parallel within the audio processor 130.

For example, the audio processor 130 may include at least one decoder (e.g., a first audio decoder 1331) for processing audio data corresponding to content reproduced by the display apparatus 400. For example, the audio processor 130 may include at least one decoder (e.g., a second audio decoder 1332) for processing audio data corresponding to a voice chat performed by the display apparatus 400.

For example, the audio processor 130 may include the first audio decoder 1331 for receiving and processing first audio data, and the second audio decoder 1332 for receiving and processing audio data corresponding to a voice chat (illustrated as 'voice chat sound' in FIG. 13).

First, reception and processing of the first audio data will be described.

The first audio data may correspond to a reproduced sound of content, and may be audio data included in the content. The first audio decoder 1331 may decode the first audio data and transmit the decoded first audio data to the Bluetooth module 111 such that the decoded first audio data is transmitted to the external audio apparatus 140.

For example, the first audio decoder 1331 may decode the received first audio data and output the decoded first audio data in the form of a stereo signal. In addition, the audio processor 130 may include a memory 1333 (hereinafter, also referred to as the PCM buffer 1333) for storing the decoded first audio data. For example, the memory 1333 may store R audio data included in the decoded first audio data and L audio data included in the first audio data.

The memory 1333 will be described below in greater detail with reference to FIG. 14.

The voice chat sound may be audio data for outputting a voice of a counterpart for the voice chat. For example, 'voice chat sound' illustrated in FIG. 13 may be the above-described second audio data. The second audio decoder 1332 may receive and decode the voice chat sound to generate decoded second audio data. Then, the decoded second audio data may be transmitted to the Bluetooth module 111 so as to be transmitted to the external audio apparatus 140.

Figure 14:
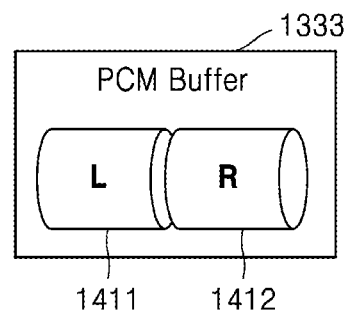
FIG. 14 is a diagram illustrating an example audio processor included in a display apparatus according to various embodiments.

FIG. 14 is a diagram illustrating an example of an audio processor included in a display apparatus according to various embodiments.

Referring to FIG. 14, the memory 1333 may store R audio data included in the first audio data and L audio data included in the first audio data, respectively. For example, the memory 1333 may include an R buffer 1412 for storing R audio data and an L buffer 1411 for storing L audio data.

The decoded first audio data has the form of a stereo signal, and thus may include R audio data and L audio data. The memory 1333 may include the R buffer 1412 and the L buffer 1411 that receive the decoded first audio data and store the R audio data and the L audio data included in the decoded first audio data, respectively.

For example, the memory 1333 may include a pulse-coded modulation (PCM) buffer that stores the L audio data and the R audio data separately from each other. For example, the memory 1333 including the PCM buffer may include the L buffer 1411 for storing L audio data and the R buffer 1412 for storing R audio data.

While audio data transmission is performed using the A2DP, the processor 150 may parse the R audio data and the L audio data stored in the memory 1333, respectively, and control the Bluetooth module 111 to transmit stereo audio data generated based on the parsed R audio data and the parsed L audio data to the external audio apparatus 700. The stereo audio data may be an audio signal including R audio data and L audio data. For example, the stereo audio data may be an audio signal obtained by mixing the R audio data and the L audio data.

For example, when the Bluetooth profile is changed in operation S830, the processor 150 may parse any one of the R audio data and the L audio data stored in the memory 1333 based on the HFP to which the Bluetooth communication profile is changed, and control the Bluetooth module 111 to transmit, to the external audio apparatus 700, the second mono audio data including the first mono audio data generated based on the parsed audio data, and the second audio data.

For example, the processor 150 performing operation S840 may parse any one of the R audio data and the L audio data stored in the memory 1333 and obtain the parsed audio data as the first mono audio data. For example, the first mono audio data may include the R audio data. Alternatively, the first mono audio data may include the L audio data. For example, the first mono audio data may be obtained from a parsed L audio signal in the L buffer 1411 of the memory 1333. Alternatively, the first mono audio data may be obtained from a parsed R audio signal in the R buffer 1412 of the memory 1333. The above-described parsing operation may be directly performed by the processor 150, or may be performed by the Bluetooth module 111 under the control by the processor 150.

The processor 150 may generate the second mono audio data including the first mono audio data and the second audio data. For example, the processor 150 may obtain the second audio data by mixing the first mono audio data with the second audio data.

For example, the mixing operation may be performed by the audio processor 130 or the Bluetooth module 111 under the control by the processor 150. For example, the mixing operation may be performed in such a manner that at least a portion of the first mono audio data and at least a portion of the second audio data are included for each time interval of a signal to be transmitted (e.g., a stream, a packet, etc.).

For example, the Bluetooth module 111 may obtain the second mono audio data by mixing the first mono audio data with the second audio data, and transmit the second mono audio data to the external audio apparatus 700, based on the HFP to which the Bluetooth communication profile is changed. Hereinafter, an example in which the mixing operation for obtaining the second audio data is performed by the Bluetooth module 111 will be described.

Referring back to FIG. 13, the Bluetooth module 111 may include a Bluetooth processor (e.g., including Bluetooth processing circuitry) 1311 and a Bluetooth interface (e.g., including Bluetooth interface circuitry) 1312.

The Bluetooth processor 1311 may include various processing circuitry and perform control such that an audio signal of a format corresponding to the Bluetooth profile is transmitted and received to and from the external audio apparatus 700. For example, when audio data required to be transmitted according to the A2DP is received from the audio processor 130, the Bluetooth processor 1311 may convert the received audio data into audio data having a transmission format of the A2DP based on A2DP configuration values, and output the audio data. For example, when audio data required to be transmitted according to the HFP is received from the audio processor 130, the Bluetooth processor 1311 may convert the received audio data into audio data having a transmission format of the HFP based on HFP configuration values, and output the audio data. For example, the A2DP configuration values may be values indicating at least one network configuration, a network and/or signal condition, and the like, which are required for performing Bluetooth communication according to the A2DP. For example, the HFP configuration values may be values indicating at least one network configuration, a network and/or signal condition, and the like, which are required for performing Bluetooth communication according to the HFP.

For example, the Bluetooth processor 1311 may include a mixer for mixing the first mono audio data with the second audio data to output the second mono audio data. The second mono audio data obtained by the mixing process may be converted into audio data having a transmission format of the HFP based on the HFP configuration values, and output. In addition, the Bluetooth processor 1311 may control the Bluetooth interface 1312 to transmit the output second mono audio data (e.g., audio data having a transmission format of the HFP) to the external audio apparatus 700.

The Bluetooth interface 1312 may include various circuitry and interface transmission and reception of audio data with the external audio apparatus 700.

For example, the Bluetooth interface 1312 may include a buffer 1313 for storing audio data output from the Bluetooth processor 1311, and a Bluetooth transceiver 1314 for transmitting the audio data stored in the buffer 1313 to the external audio apparatus 700. For example, the buffer 1313 may temporarily store audio data, which is to be transmitted or has been received through the Bluetooth transceiver 1314. For example, the buffer 1313 may temporarily store the second mono audio data to be transmitted to the external audio apparatus 700 through the Bluetooth transceiver 1314. Alternatively, the buffer 1313 may temporarily store audio data received from the external audio apparatus 700 through the Bluetooth transceiver 1314 (e.g., audio data corresponding to a voice of the user received through the external audio apparatus 700).

The Bluetooth transceiver 1314 converts audio data input through an external audio input/output apparatus, (e.g., the external audio apparatus 700) into an audio format signal that may be processed by the Bluetooth processor 1311, or vice versa.

Figure 15:
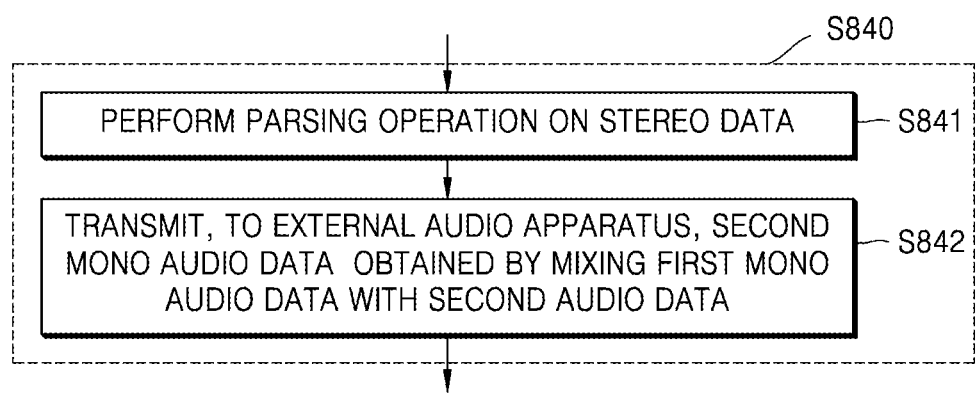
FIG. 15 is a flowchart illustrating an example method of operating a display apparatus according to various embodiments.

FIG. 15 is a partial flowchart illustrating an example method of operating a display apparatus according to various embodiments. FIG. 15 may be a detailed flowchart illustrating operation S840 performed by the display apparatus 100, 400, 500, or 600 according to various embodiments.

Referring to FIG. 15, subsequent to operation S830, the method of operating a display apparatus may include performing a parsing operation on stereo data corresponding to the first audio data according to a second audio transmission protocol (e.g., an HFP protocol) to which the audio transmission protocol is changed (S841). For example, the first audio data may be decoded and then stored in the memory 1333. As described with reference to FIGS. 13 and 14, the decoded first audio data may be stereo data, and the memory 1333 may store R audio data and L audio data of the stereo data, separately from each other. For example, the memory 1333 may include the L buffer 1411 for storing the L audio data of the stereo data corresponding to the first audio data, and the R buffer 1412 for storing the R audio data of the stereo data corresponding to the first audio data. The processor 150 may parse any one of the R audio data and the L audio data stored in the memory 1333, and obtain the first mono audio data based on the parsed audio data. For example, the first mono audio data may be data obtained by parsing any one of the R audio data and the L audio data. As another example, the first mono audio data may be data obtained by compressing or encoding data obtained by parsing any one of the R audio data and the L audio data.

As described above, by parsing any one of the R audio data and the L audio data included in the stereo data corresponding to the first audio data, the first mono audio data having the form of a mono signal may be obtained without a separate operation of modifying or converting the first audio data. Accordingly, the first mono audio data having the form of a mono signal may be quickly and simply obtained from the first audio data having the form of a stereo signal.

The second mono audio data may be obtained by mixing the first mono audio data obtained by performing the parsing operation in operation S841, with the second audio data, and the obtained second mono audio data may be transmitted to the external audio apparatus 700 (S842).

For example, when the Bluetooth profile is changed in operation S830, the processor 150 may parse any one of the R audio data and the L audio data, which is stored in the memory 1333 and include the stereo data corresponding to the first audio data, and control the Bluetooth module 111 to transmit, to the external audio apparatus 700, the second mono audio data including the first mono audio data, which is the parsed audio data, and the second audio data, based on the HFP to which the Bluetooth profile is changed. For example, the second mono audio data may be audio data generated by mixing the first mono audio data with the second audio data. The parsing operation has been described in detail with reference to FIGS. 13 and 14, and thus the description thereof may not be repeated here.

Figure 16:
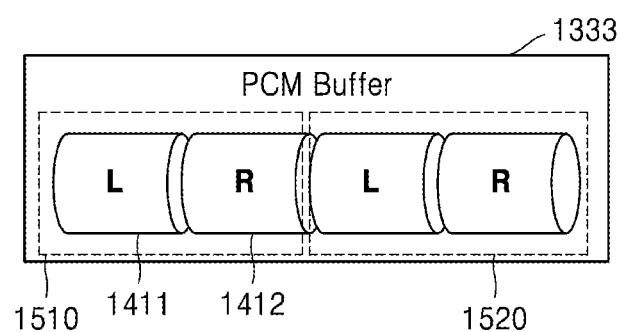
FIG. 16 is a diagram illustrating an example audio processor included in a display apparatus according to various embodiments.

FIG. 16 is a diagram illustrating an example of an audio processor included in a display apparatus according to various embodiments. In FIG. 16, the same elements as those of FIG. 14 are illustrated using the same reference numerals.

In an embodiment of the disclosure, the display apparatus 100, 400, 500, or 600 may support processing of multi-channel audio data in Bluetooth communication. For example, the display device may support processing of multi-channel audio data, and may decode and store a plurality of different pieces of audio data in parallel. As described with reference to FIG. 13, the audio processor 130 may include a plurality of decoders for processing a plurality of pieces of audio data, respectively.

For example, the display apparatus (e.g., the display apparatus 400) may store the plurality of pieces of decoded audio data in the memory 1333 separately from each other.

Referring to FIG. 16, for multi-channel transmission, the memory 1333 may be a PCM buffer that decodes a plurality of different pieces of audio data and stores a plurality of pieces of decoded audio data separately from each other. For example, the PCM buffer 1333 may include a first region 1510 for storing one piece of audio data and a second region 1520 for storing another piece of audio data.

For example, the audio data stored in the first region 1510 may be audio data to be transmitted to a first external audio apparatus through a first Bluetooth communication channel of a Bluetooth communication network. In addition, the audio data stored in the second region 1520 may be audio data to be transmitted to a second external audio apparatus through a second Bluetooth communication channel of the Bluetooth communication network.

For example, the audio data stored in the first region 1510 may be audio data corresponding to first content. In addition, the audio data stored in the second region 1520 may be audio data corresponding to second content.

As another example, the audio data stored in the first region 1510 may be audio data to be transmitted to an external audio apparatus (e.g., the external audio apparatus 700) using the first Bluetooth communication channel (e.g., a channel established based on the A2DP) of the Bluetooth communication network. In addition, the audio data stored in the second region 1520 may be audio data to be transmitted to an external audio apparatus (e.g., the external audio apparatus 700) using the second Bluetooth communication channel (in detail, a channel established based on the HFP) of the Bluetooth communication network.

Figure 17:
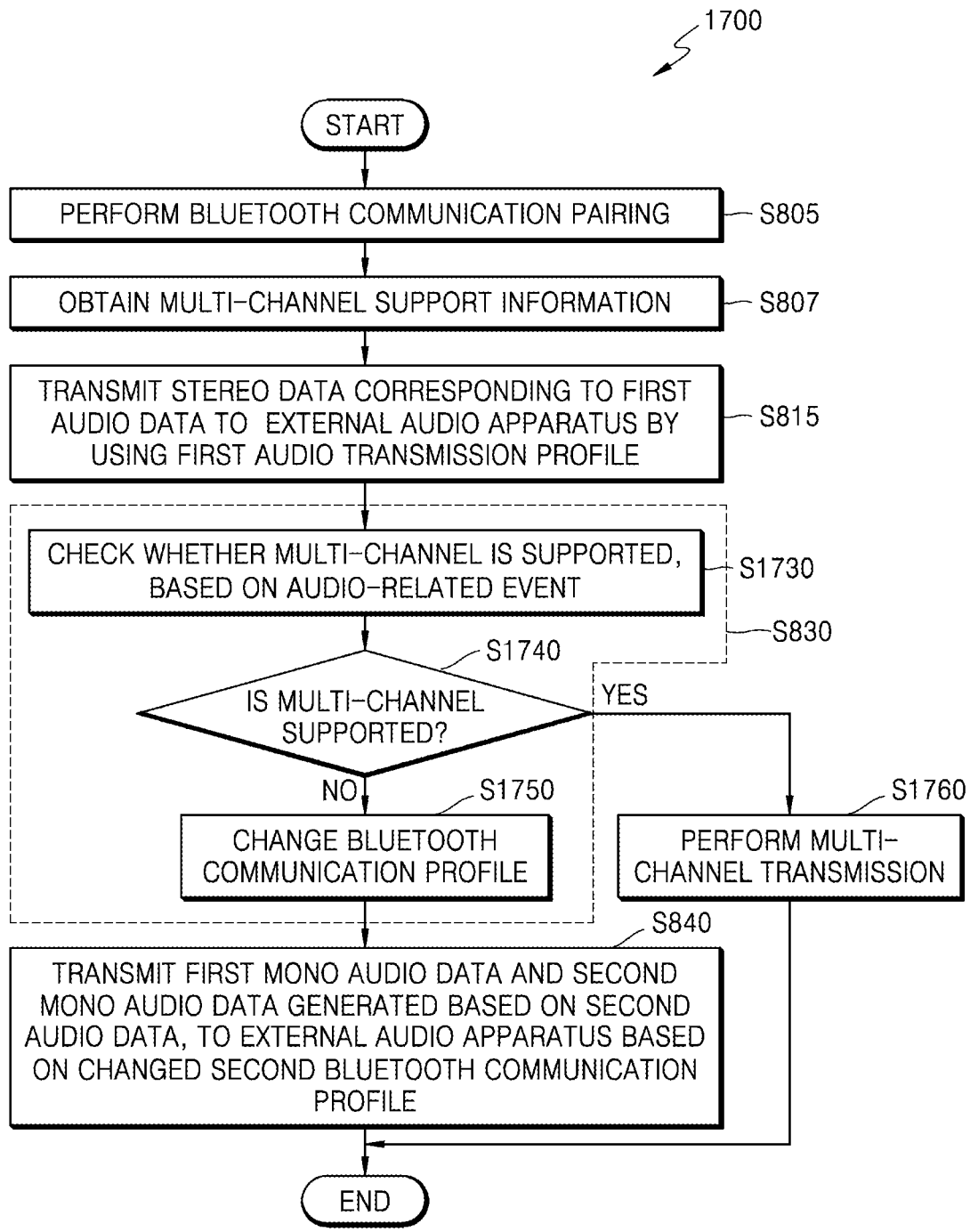
FIG. 17 is a flowchart illustrating an example method of operating a display apparatus according to various embodiments.

FIG. 17 is a flowchart illustrating an example method 1700 of operating a display apparatus according to various embodiments. The method 1700 of operating a display apparatus is illustrated in FIG. 17 as a flowchart of operations performed by the display apparatus 100, 400, 500, or 600 according to an embodiment of the disclosure described with reference to FIGS. 1 to 16. Therefore, among the operations included in the operating method 1700 of a display apparatus, the same operations as those illustrated in FIG. 8A are illustrated using the same reference numerals, and thus the description provided above with reference to FIG. 8A may not be repeated. In addition, among the operations included in the operating method 1700 of a display apparatus, the same operations as those illustrated in FIG. 8C are illustrated using the same reference numerals, and thus the description provided above with reference to FIG. 8C may not be repeated.

In addition, hereinafter, an example will be described in which the operating method 1700 of a display apparatus is performed by the display apparatus 400 illustrated in FIGS. 4 and 7.

Referring to FIG. 17, the method 1700 of operating a display apparatus may include performing Bluetooth pairing between the display apparatus 400 and the external audio apparatus 700 (S805). For example, operation S830 may be performed by the communicator 110 under the control by the processor 150.

Pairing may be performed using any communication network. For example, pairing may be performed through a Bluetooth communication network, a Wi-Fi communication network, or the like. While pairing is performed, the display apparatus 400 may exchange, with the external audio apparatus 700, network connection information required to establish a communication network therebetween conforming to a certain standard. For example, the display apparatus 400 may exchange, with the external audio apparatus 700, network connection information required to establish a communication network therebetween according to a Bluetooth standard. While pairing is performed, the display apparatus 400 may obtain information about the external audio apparatus 700, for example, information about a product specification of the external audio apparatus 700. For example, the display apparatus 400 may obtain information about whether the external audio apparatus 700 supports multi-channel transmission using a plurality of channels in Bluetooth communication.

During the Bluetooth pairing in operation S805, multi-channel support information indicating whether the display apparatus 400 supports multi-channel transmission may be obtained (S807). For example, the processor 150 may obtain specification information including information about whether the external audio apparatus 700 paired with the display apparatus 400 supports multi-channel Bluetooth communication including a first Bluetooth communication channel and a second Bluetooth communication channel.

The operating method 1700 of a display apparatus further includes transmitting stereo data corresponding to first audio data included in content being reproduced, to the external audio apparatus using a first audio transmission profile (S815). For example, operation S815 may be performed by the Bluetooth module 111 under the control by the processor 150. In an embodiment of the disclosure, the processor 150 may perform Bluetooth pairing with the external audio apparatus 700, and obtain, during the Bluetooth pairing, the specification information including the information about whether the external audio apparatus 700 supports multi-channel Bluetooth communication including the first Bluetooth communication channel and the second Bluetooth communication channel. Then, when a voice chat event occurs, the Bluetooth module 111 may be controlled such that the first Bluetooth communication channel performs communication according to the A2DP and the second Bluetooth communication channel performs communication according to the HFP, based on the specification information.

For example, based on an audio-related event, the display apparatus 400 may determine whether the paired external audio apparatus supports multi-channel transmission (S1730). For example, operation S805 may be performed by the processor 150.

For example, in response to the occurrence of the audio-related event, the processor 150 may determine whether the external audio apparatus paired with the display apparatus 400 supports multi-channel transmission (S1730).

For example, the operating method 1700 of a display apparatus may further include controlling the Bluetooth module 111 such that the first Bluetooth communication channel performs communication according to the A2DP and the second Bluetooth communication channel performs communication according to the HFP, based on the specification information (e.g., information indicating whether multi-channel transmission is supported) obtained in operation S807.

For example, operation S1730 of determining whether multi-channel transmission is supported may be performed by transmitting, from the display apparatus 400 to the external audio apparatus 700, a query signal for inquiring as to whether multi-channel transmission is supported, and determining whether multi-channel transmission is supported, based on a response signal to the query signal. For example, operation S1730 may include transmitting, to the external audio apparatus 700, a query signal inquiring as to whether the external audio apparatus 700 supports multi-channel Bluetooth communication including a first Bluetooth communication channel and a second Bluetooth communication channel, based on a voice chat event, and determining whether the external audio apparatus 700 supports multi-channel Bluetooth communication, based on a response signal transmitted by the external audio apparatus 700 in response to the query signal. For example, when the response signal includes information indicating that the external audio apparatus 700 supports multi-channel Bluetooth communication, the processor 150 may control the Bluetooth module 111 such that the first Bluetooth communication channel performs communication according to the A2DP and the second Bluetooth communication channel performs communication according to the HFP.

For example, when it is determined, in operation S1740, that the external audio apparatus 700 supports multi-channel transmission, a multi-channel transmission operation may be performed (S1760). For example, when it is determined, in operation S1730, that the external audio apparatus 700 supports multi-channel transmission, the first Bluetooth communication channel may be controlled to perform communication based on the A2DP, and the second Bluetooth communication channel may be controlled to perform communication based on the HFP (S1760).

For example, when the external audio apparatus 700 supports multi-channel transmission, in response to the occurrence of the voice chat event, the audio data corresponding to the content being reproduced may be transmitted to the external audio apparatus 700 using the first Bluetooth communication channel established based on the A2DP, and second audio data corresponding to a voice chat may be transmitted to the external audio apparatus 700 using the second Bluetooth communication channel established based on the HFP.

When it is determined, in operation S1740, that the external audio apparatus 700 does not support multi-channel transmission, operation S1750 may be performed.

For example, the operating method 1700 of a display apparatus may further include, when it is determined, in operation S1740, that the external audio apparatus 700 does not support multi-channel transmission, changing the Bluetooth communication profile for audio data transmission from the A2DP to the HFP (S1750). Operation S1750 of changing the Bluetooth communication protocol corresponds to operation S830 illustrated in FIG. 8A, and thus a detailed description thereof may not be repeated here.

The method 1700 of operating a display apparatus further includes, subsequent to operation S1750, transmitting first mono audio data corresponding to the first audio data and second mono audio data generated based on second audio data corresponding to the voice chat event, to the external audio apparatus based on the HFP to which the Bluetooth communication profile is changed (S840).

According to an embodiment of the disclosure, when a voice chat event occurs while a reproduced sound of content being reproduced by a display apparatus is output through an external audio apparatus (e.g., a Bluetooth headset), the display apparatus may output a notification message and perform a voice chat operation based on a user input corresponding to the notification message, thereby operating according to a user's intention. Accordingly, it is possible to increase the satisfaction of a user using the display apparatus.

A method of operating a display apparatus according to an embodiment of the disclosure may be embodied as program instructions executable by various computer devices, and recorded on a non-transitory computer-readable medium. In addition, an embodiment of the disclosure may be implemented in a computer-readable recording medium having recorded thereon one or more programs including instructions for executing the operating method of a display apparatus.

The computer-readable medium may include program instructions, data files, data structures, or the like separately or in combinations. The program instructions to be recorded on the medium may be specially designed and configured for the disclosure or may be well-known to and be usable by one of ordinary skill in the art of computer software. Examples of the computer-readable recording medium include magnetic media such as hard disks, floppy disks, or magnetic tapes, optical media such as compact disc ROMs (CD-ROMs) or digital video discs (DVDs), magneto-optical media such as floptical disks, and hardware devices such as ROM, RAM, and flash memory, which are specially configured to store and execute program instructions. Examples of the program instructions include not only machine code, such as code made by a compiler, but also high-level language code that is executable by a computer using an interpreter or the like.

Here, the machine-readable storage medium may be provided in the form of a non-transitory storage medium. Here, the 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment of the disclosure, the method according to various embodiments disclosed herein may be included in a computer program product and provided. The computer program product may be traded between a seller and a purchaser as a commodity. The computer program product may be distributed in the form of a machine-readable storage medium (e.g., a CD-ROM), or may be distributed online (e.g., downloaded or uploaded) through an application store (e.g., Play Store™) or directly between two user devices (e.g., smart phones). In the case of online distribution, at least a portion of the computer program product (e.g., a downloadable app) may be temporarily stored in a machine-readable storage medium such as a manufacturer's server, an application store's server, or a memory of a relay server.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display apparatus comprising:
   a display;
   an audio processor configured to process audio data;
   a Bluetooth module comprising circuitry configured to perform Bluetooth communication with an external audio apparatus; and
   a processor configured to execute at least one instruction and to: control the Bluetooth module to transmit stereo data corresponding to first audio data included in content being reproduced to the external audio apparatus using a first audio transmission profile; change an audio transmission profile from the first audio transmission profile to a second audio transmission profile based on an audio-related event occurring while the stereo data is transmitted using the first audio transmission profile; obtain first mono audio data by selecting any one of a plurality of pieces of sound data included in the stereo data; and control the Bluetooth module to transmit the first mono audio data and second mono audio data generated based on second audio data corresponding to the audio-related event to the external audio apparatus using the second audio transmission profile.

2. The display apparatus of claim 1, wherein the audio processor is further configured to select any one of right (R) audio data, including first sound data included in the stereo data, and left (L) audio data, which is second sound data included in the stereo data, and obtain the selected data as the first mono audio data.

3. The display apparatus of claim 1, wherein the audio processor includes a memory for storing right (R) audio data, which is first sound data included in the stereo data, and left (L) audio data, which is second sound data included in the stereo data, separately from each other, and
   the processor is further configured to: while audio data transmission is performed using the first audio transmission profile, parse right (R) audio data and left (L) audio data stored in the memory, respectively; control the Bluetooth module to transmit stereo audio data generated based on the parsed R audio data and the parsed L audio data to the external audio apparatus; parse, based on the audio transmission profile being changed to the second audio transmission profile, any one of the R audio data and the L audio data stored in the memory; and control the Bluetooth module to transmit the second mono audio data to the external audio apparatus,
   wherein the second mono audio data includes:
   the first mono audio data corresponding to the parsed audio data; and
   the second audio data.

4. The display apparatus of claim 1, wherein the Bluetooth module is further configured to: based on the audio transmission profile being changed to the second audio transmission profile, obtain the second mono audio data by mixing the first mono audio data with the second audio data; and transmit the second mono audio data to the external audio apparatus.

5. The display apparatus of claim 3, wherein the memory includes a pulse-coded modulation (PCM) buffer that stores the L audio data and the R audio data separately from each other.

6. The display apparatus of claim 1, wherein the first audio transmission profile includes an Advanced Audio Distribution Profile (A2DP), and
   the second audio transmission profile includes a Hands-Free Profile (HFP).

7. The display apparatus of claim 1, wherein the processor is further configured to: output a notification message corresponding to the audio-related event; and change the audio transmission profile from the first audio transmission profile to the second audio transmission profile, based on an input received in response to the output notification message.

8. The display apparatus of claim 7, wherein the input includes an input requesting that operations of inputting and outputting audio data corresponding to the audio-related event be performed using the external audio device.

9. The display apparatus of claim 7, wherein the processor is further configured to: based on the audio-related event occurring while game content is reproduced, control the notification message including an icon for activating a microphone included in the external audio apparatus, to be displayed on a screen in which the game content is reproduced.

10. The display apparatus of claim 9, wherein the processor is further configured to: based on the input for selecting the icon, change the audio transmission profile to a Hands-Free Profile (HFP), which is the second audio transmission profile.

11. The display apparatus of claim 1, wherein the processor is further configured to: based on occurrence of the audio-related event, control a notification message for determining whether to perform a voice chat using the external audio apparatus, to be output on the display.

12. The display apparatus of claim 1, wherein the processor is further configured to: based on occurrence of the audio-related event, control a notification message for determining whether to perform a voice chat using the external audio apparatus, to be output as a voice message through the external audio apparatus.

13. The display apparatus of claim 7, wherein the notification message includes notification information indicating that quality of audio corresponding to the content being reproduced may deteriorate based an operation of outputting audio corresponding to the audio-related event being performed using the external audio apparatus.

14. The display apparatus of claim 1, wherein the processor is further configured to: perform Bluetooth pairing with the external audio apparatus; obtain, during the Bluetooth pairing, specification information including information about whether the external audio apparatus supports multi-channel Bluetooth communication including a first Bluetooth communication channel and a second Bluetooth communication channel; and, based on the audio-related event occurring, control the Bluetooth module such that the first Bluetooth communication channel performs communication according to the first audio transmission profile and the second Bluetooth communication channel performs communication according to the second audio transmission profile, based on the specification information.

15. The display apparatus of claim 1, wherein the processor is further configured to: based on the audio-related event, transmit, to the external audio apparatus, a query signal inquiring whether the external audio apparatus supports multi-channel Bluetooth communication including a first Bluetooth communication channel and a second Bluetooth communication channel; and, based on a response signal received from the external audio apparatus in response to the query signal, control the Bluetooth module such that the first Bluetooth communication channel performs communication according to the first audio transmission profile and that the second Bluetooth communication channel performs communication according to the second audio transmission profile.

16. A method of operating a display apparatus, the method comprising:
    transmitting stereo data corresponding to first audio data included in content being reproduced, to an external audio apparatus using a first audio transmission profile;
    changing an audio transmission profile from the first audio transmission profile to a second audio transmission profile based on an audio-related event occurring while the stereo data is transmitted using the first audio transmission profile; and
    obtaining first mono audio data by selecting any one of a plurality of pieces of sound data included in the stereo data, and transmitting the first mono audio data and second mono audio data generated based on second audio data corresponding to the audio-related event to the external audio apparatus using the second audio transmission profile.

17. The method of claim 16, wherein the transmitting of the second mono audio data comprises selecting any one of right (R) audio data, which is first sound data included in the stereo data, and left (L) audio data, which is second sound data included in the stereo data, and obtaining the selected data as the first mono audio data.

18. The method of claim 16, further comprising outputting a notification message corresponding to the audio-related event,
    wherein the changing of the audio transmission profile to the second audio transmission profile comprises changing the audio transmission profile from the first audio transmission profile to the second audio transmission profile, based on an input received in response to the output notification message.

19. The method of claim 16, further comprising:
    performing Bluetooth pairing between the display apparatus and the external audio apparatus;
    obtaining, during the Bluetooth pairing, specification information including information about whether the external audio apparatus supports multi-channel Bluetooth communication including a first Bluetooth communication channel and a second Bluetooth communication channel; and,
    based on the audio-related event occurring, performing control such that the first Bluetooth communication channel performs communication according to the first audio transmission profile and that the second Bluetooth communication channel performs communication according to the second audio transmission profile based on the specification information.

* * * * *